United States Patent
Besehanic

(10) Patent No.: US 10,694,254 B2
(45) Date of Patent: *Jun. 23, 2020

(54) METHODS AND APPARATUS TO MEASURE EXPOSURE TO STREAMING MEDIA

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,986

(22) Filed: May 20, 2019

(65) Prior Publication Data

US 2019/0273967 A1 Sep. 5, 2019

Related U.S. Application Data

(63) Continuation of application No. 15/701,397, filed on Sep. 11, 2017, now Pat. No. 10,299,002, which is a (Continued)

(51) Int. Cl.
| | |
|---|---|
| *H04N 21/466* | (2011.01) |
| *H04N 21/442* | (2011.01) |
| *H04N 21/25* | (2011.01) |

(52) U.S. Cl.
CPC ....... *H04N 21/4667* (2013.01); *H04N 21/252* (2013.01); *H04N 21/44204* (2013.01); *H04N 21/44222* (2013.01)

(58) Field of Classification Search
CPC ......... H04N 21/4667; H04N 21/44222; H04N 21/44204; H04N 21/252
See application file for complete search history.

(56) References Cited

U.S. PATENT DOCUMENTS

| | | |
|---|---|---|
| 4,230,990 A | 10/1980 | Lert, Jr. et al. |
| 4,647,974 A | 3/1987 | Butler et al. |
| | (Continued) | |

FOREIGN PATENT DOCUMENTS

| | | |
|---|---|---|
| AU | 8976601 | 2/2002 |
| AU | 9298201 | 4/2002 |
| | (Continued) | |

OTHER PUBLICATIONS

United States Patent and Trademark Office, "Final Office Action", issued in connection with U.S. Appl. No. 14/922,918, dated Apr. 6, 2017, 18 pages.

(Continued)

*Primary Examiner* — Junior O Mendoza
(74) *Attorney, Agent, or Firm* — Hanley, Flight & Zimmerman, LLC

(57) ABSTRACT

Methods and apparatus to measure exposure to streaming media are disclosed. An example apparatus includes memory including first instructions that, when executed, cause at least one processor to access media to be provided to a client device, embed advertisement markers and metadata generated in association with the media into a media file, and provide second instructions and the media file to the client device. The second instructions cause the client device to update a multi-file counter with an offset based on a duration of the first media segment, detect that a second media segment is a segment of the multi-segment media based on the media file, add a determined playback time to the multi-file counter to determine a corresponding playback time of the multi-segment media, and attempt to lookup a metadata tag and corresponding playback positions based on the playback time of the multi-segment media.

19 Claims, 10 Drawing Sheets

Related U.S. Application Data continuation of application No. 14/725,877, filed on May 29, 2015, now Pat. No. 9,762,965.

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |
| 4,745,468 A | 5/1988 | Von Kohorn |
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,003,591 A | 3/1991 | Kauffman et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |
| 5,128,752 A | 7/1992 | Von Kohorn |
| 5,227,874 A | 7/1993 | Von Kohorn |
| 5,249,044 A | 9/1993 | Von Kohorn |
| 5,283,734 A | 2/1994 | Von Kohorn |
| 5,331,544 A | 7/1994 | Lu et al. |
| 5,401,946 A | 3/1995 | Weinblatt |
| 5,425,100 A | 6/1995 | Thomas et al. |
| 5,481,294 A | 1/1996 | Thomas et al. |
| 5,512,933 A | 4/1996 | Wheatley et al. |
| 5,524,195 A | 6/1996 | Clanton, III et al. |
| 5,543,856 A | 8/1996 | Rosser et al. |
| 5,559,716 A | 9/1996 | Gaalswyk |
| 5,571,962 A | 11/1996 | Georgi et al. |
| 5,579,124 A | 11/1996 | Aijala et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,719,634 A | 2/1998 | Keery et al. |
| 5,734,413 A | 3/1998 | Lappington et al. |
| 5,740,035 A | 4/1998 | Cohen et al. |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,880,789 A | 3/1999 | Inaba |
| 5,893,067 A | 4/1999 | Bender et al. |
| 5,910,987 A | 6/1999 | Ginter et al. |
| 5,918,223 A | 6/1999 | Blum et al. |
| 5,930,369 A | 7/1999 | Cox et al. |
| 5,933,789 A | 8/1999 | Byun et al. |
| 5,956,716 A | 9/1999 | Kenner et al. |
| 5,966,120 A | 10/1999 | Arazi et al. |
| 5,974,299 A | 10/1999 | Massetti |
| 5,974,396 A | 10/1999 | Anderson et al. |
| 5,987,855 A | 11/1999 | Dey et al. |
| 6,034,722 A | 3/2000 | Viney et al. |
| 6,049,830 A | 4/2000 | Saib |
| 6,055,573 A | 4/2000 | Gardenswartz et al. |
| 6,061,793 A | 5/2000 | Tewfik et al. |
| 6,088,659 A | 7/2000 | Kelley et al. |
| 6,108,637 A | 8/2000 | Blumenau |
| 6,115,654 A | 9/2000 | Eid et al. |
| 6,154,209 A | 11/2000 | Naughton et al. |
| 6,208,735 B1 | 3/2001 | Cox et al. |
| 6,216,129 B1 | 4/2001 | Eldering |
| 6,282,573 B1 | 8/2001 | Darago et al. |
| 6,286,036 B1 | 9/2001 | Rhoads |
| 6,286,140 B1 | 9/2001 | Ivanyi |
| 6,298,348 B1 | 10/2001 | Eldering |
| 6,308,327 B1 | 10/2001 | Liu et al. |
| 6,310,956 B1 | 10/2001 | Morito et al. |
| 6,327,619 B1 | 12/2001 | Blumenau |
| 6,331,876 B1 | 12/2001 | Koster et al. |
| 6,335,736 B1 | 1/2002 | Wagner et al. |
| 6,363,159 B1 | 3/2002 | Rhoads |
| 6,363,488 B1 | 3/2002 | Ginter et al. |
| 6,377,993 B1 | 4/2002 | Brandt et al. |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,442,285 B2 | 8/2002 | Rhoads et al. |
| 6,463,445 B1 | 10/2002 | Suzuki et al. |
| 6,487,564 B1 | 11/2002 | Asai et al. |
| 6,505,160 B1 | 1/2003 | Levy et al. |
| 6,512,836 B1 | 1/2003 | Xie et al. |
| 6,513,014 B1 | 1/2003 | Walker et al. |
| 6,519,509 B1 | 2/2003 | Nierlich et al. |
| 6,522,771 B2 | 2/2003 | Rhoads |
| 6,539,095 B1 | 3/2003 | Rhoads |
| 6,546,556 B1 | 4/2003 | Kataoka et al. |
| 6,553,178 B2 | 4/2003 | Abecassis |
| 6,642,966 B1 | 11/2003 | Limaye |
| 6,647,269 B2 | 11/2003 | Hendrey et al. |
| 6,651,253 B2 | 11/2003 | Dudkiewicz et al. |
| 6,654,480 B2 | 11/2003 | Rhoads |
| 6,665,873 B1 | 12/2003 | Van Gestel et al. |
| 6,671,732 B1 | 12/2003 | Weiner |
| 6,675,383 B1 | 1/2004 | Wheeler et al. |
| 6,683,966 B1 | 1/2004 | Tian et al. |
| 6,710,815 B1 | 3/2004 | Billmaier et al. |
| 6,714,683 B1 | 3/2004 | Tian et al. |
| 6,714,684 B2 | 3/2004 | Yamaguchi et al. |
| 6,750,985 B2 | 6/2004 | Rhoads |
| 6,766,523 B2 | 7/2004 | Herley |
| 6,795,972 B2 | 9/2004 | Rovira |
| 6,804,379 B2 | 10/2004 | Rhoads |
| 6,829,368 B2 | 12/2004 | Meyer et al. |
| 6,853,634 B1 | 2/2005 | Davies et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,968,315 B1 | 11/2005 | Nakisa |
| 6,968,564 B1 | 11/2005 | Srinivasan |
| 6,970,886 B1 | 11/2005 | Conwell et al. |
| 6,996,213 B1 | 2/2006 | De Jong |
| 7,003,731 B1 | 2/2006 | Rhoads et al. |
| 7,007,166 B1 | 2/2006 | Moskowitz et al. |
| 7,032,178 B1 | 4/2006 | McKnight et al. |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,085,844 B2 | 8/2006 | Thompson |
| 7,095,871 B2 | 8/2006 | Jones et al. |
| 7,143,949 B1 | 12/2006 | Hannigan |
| 7,158,943 B2 | 1/2007 | Van der Riet |
| 7,171,018 B2 | 1/2007 | Rhoads et al. |
| 7,174,293 B2 | 2/2007 | Kenyon et al. |
| 7,181,042 B2 | 2/2007 | Tian |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,383,229 B2 | 6/2008 | Jacoby |
| 7,421,723 B2 | 9/2008 | Harkness et al. |
| 7,443,292 B2 | 10/2008 | Jensen et al. |
| 7,451,317 B2 | 11/2008 | Oh et al. |
| 7,463,143 B2 | 12/2008 | Forr et al. |
| 7,519,658 B1 | 4/2009 | Anglin et al. |
| 7,584,194 B2 | 9/2009 | Tuttle et al. |
| 7,592,908 B2 | 9/2009 | Zhang et al. |
| 7,623,823 B2 | 11/2009 | Zito et al. |

(56) References Cited

U.S. PATENT DOCUMENTS

| | | |
|---|---|---|
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,761,465 B1 | 7/2010 | Nonaka et al. |
| 7,827,312 B2 | 11/2010 | Ramaswamy et al. |
| 7,962,934 B1 | 6/2011 | Eldering et al. |
| 7,992,183 B1 | 8/2011 | Harrenstien |
| 8,065,703 B2 | 11/2011 | Wilson et al. |
| 8,103,879 B2 | 1/2012 | Levy et al. |
| 8,176,322 B2 | 5/2012 | Lee et al. |
| 8,451,868 B2 | 5/2013 | Johnson et al. |
| 8,578,272 B2 | 11/2013 | Pantos et al. |
| 8,645,373 B2 | 2/2014 | Knight et al. |
| 8,719,880 B2 | 5/2014 | Nakamura |
| 8,732,185 B1 | 5/2014 | Lynn et al. |
| 8,856,869 B1 | 10/2014 | Brinskelle |
| 8,990,844 B2 | 3/2015 | Oh et al. |
| 9,197,421 B2 | 11/2015 | Besehanic |
| 9,209,978 B2 | 12/2015 | Besehanic |
| 9,210,208 B2 | 12/2015 | Ramaswamy et al. |
| 9,313,544 B2 | 4/2016 | Besehanic |
| 9,357,261 B2 | 5/2016 | Besehanic |
| 9,515,904 B2 | 12/2016 | Besehanic et al. |
| 9,609,034 B2 | 3/2017 | Ramaswamy et al. |
| 9,762,965 B2 * | 9/2017 | Besehanic .......... H04N 21/4667 |
| 10,299,002 B2 * | 5/2019 | Besehanic .......... H04N 21/4667 |
| 2001/0031066 A1 | 10/2001 | Meyer et al. |
| 2001/0044851 A1 | 11/2001 | Rothman et al. |
| 2001/0044899 A1 | 11/2001 | Levy |
| 2002/0001395 A1 | 1/2002 | Davis et al. |
| 2002/0012443 A1 | 1/2002 | Rhoads et al. |
| 2002/0016969 A1 | 2/2002 | Kimble |
| 2002/0032734 A1 | 3/2002 | Rhoads |
| 2002/0033842 A1 | 3/2002 | Zetts |
| 2002/0052885 A1 | 5/2002 | Levy |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0083324 A1 | 6/2002 | Hirai |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0124246 A1 | 9/2002 | Kaminsky et al. |
| 2002/0133705 A1 | 9/2002 | Tagashira et al. |
| 2002/0138852 A1 | 9/2002 | Reynolds et al. |
| 2002/0138853 A1 | 9/2002 | Chuuma et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1 | 1/2003 | Levy et al. |
| 2003/0039465 A1 | 2/2003 | Bjorgan et al. |
| 2003/0055949 A1 | 3/2003 | Coulombe et al. |
| 2003/0079131 A1 | 4/2003 | Reefman |
| 2003/0088674 A1 | 5/2003 | Ullman et al. |
| 2003/0093810 A1 | 5/2003 | Taniguchi |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 | 8/2003 | Shen et al. |
| 2003/0177488 A1 | 9/2003 | Smith et al. |
| 2003/0185232 A1 | 10/2003 | Moore et al. |
| 2003/0212710 A1 | 11/2003 | Guy |
| 2004/0003394 A1 | 1/2004 | Ramaswamy |
| 2004/0009763 A1 | 1/2004 | Stone et al. |
| 2004/0019690 A1 | 1/2004 | Cardno et al. |
| 2004/0025181 A1 | 2/2004 | Addington et al. |
| 2004/0037271 A1 | 2/2004 | Liscano et al. |
| 2004/0038692 A1 | 2/2004 | Muzaffar |
| 2004/0064319 A1 | 4/2004 | Nehauser et al. |
| 2004/0073916 A1 | 4/2004 | Petrovic et al. |
| 2004/0073951 A1 | 4/2004 | Bae et al. |
| 2004/0088347 A1 | 5/2004 | Yeager et al. |
| 2004/0088556 A1 | 5/2004 | Weirauch |
| 2004/0125125 A1 | 7/2004 | Levy |
| 2004/0128514 A1 | 7/2004 | Rhoads |
| 2004/0137929 A1 | 7/2004 | Jones et al. |
| 2004/0146161 A1 | 7/2004 | De Jong |
| 2004/0153649 A1 | 8/2004 | Rhoads et al. |
| 2004/0156489 A1 | 8/2004 | Vishik et al. |
| 2004/0158858 A1 | 8/2004 | Paxton et al. |
| 2004/0199387 A1 | 10/2004 | Wang et al. |
| 2004/0254887 A1 | 12/2004 | Jacoby |
| 2005/0028189 A1 | 2/2005 | Heine et al. |
| 2005/0033758 A1 | 2/2005 | Baxter |
| 2005/0058319 A1 | 3/2005 | Rhoads et al. |
| 2005/0086682 A1 | 4/2005 | Burges et al. |
| 2005/0138179 A1 | 6/2005 | Encarnaction et al. |
| 2005/0144004 A1 | 6/2005 | Bennett et al. |
| 2005/0177738 A1 | 8/2005 | Van Der Veen et al. |
| 2005/0192933 A1 | 9/2005 | Rhoads et al. |
| 2005/0193425 A1 | 9/2005 | Sull et al. |
| 2005/0204379 A1 | 9/2005 | Yamamori |
| 2005/0216346 A1 | 9/2005 | Kusumoto et al. |
| 2005/0234774 A1 | 10/2005 | Dupree |
| 2006/0026431 A1 | 2/2006 | Campello De Souza |
| 2006/0031297 A1 | 2/2006 | Zuidema |
| 2006/0056625 A1 | 3/2006 | Nakabayashi et al. |
| 2006/0059277 A1 | 3/2006 | Zito et al. |
| 2006/0062426 A1 | 3/2006 | Levy et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0161635 A1 | 7/2006 | Lamkin et al. |
| 2006/0167747 A1 | 7/2006 | Goodman et al. |
| 2006/0168613 A1 | 7/2006 | Wood et al. |
| 2006/0195614 A1 | 8/2006 | Sena et al. |
| 2006/0195886 A1 | 8/2006 | Ashley |
| 2006/0212705 A1 | 9/2006 | Thommana et al. |
| 2006/0221173 A1 | 10/2006 | Duncan |
| 2006/0224798 A1 | 10/2006 | Klein et al. |
| 2006/0242325 A1 | 10/2006 | Ramaswamy et al. |
| 2007/0006250 A1 | 1/2007 | Croy et al. |
| 2007/0016918 A1 | 1/2007 | Alcorn et al. |
| 2007/0055987 A1 | 3/2007 | Lu et al. |
| 2007/0074020 A1 | 3/2007 | Nishimura |
| 2007/0083611 A1 | 4/2007 | Farago et al. |
| 2007/0110089 A1 | 5/2007 | Essafi et al. |
| 2007/0112837 A1 | 5/2007 | Houh et al. |
| 2007/0118375 A1 | 5/2007 | Kenyon et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0136753 A1 | 6/2007 | Bovenschulte et al. |
| 2007/0136777 A1 | 6/2007 | Hasek et al. |
| 2007/0149114 A1 | 6/2007 | Danilenko |
| 2007/0157262 A1 | 7/2007 | Ramaswamy et al. |
| 2007/0162927 A1 | 7/2007 | Ramaswamy et al. |
| 2007/0186228 A1 | 8/2007 | Ramaswamy et al. |
| 2007/0186288 A1 | 8/2007 | Peterson et al. |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0250901 A1 | 10/2007 | McIntire et al. |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0028223 A1 | 1/2008 | Rhoads |

(56) References Cited

U.S. PATENT DOCUMENTS

| | | |
|---|---|---|
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0065507 A1 | 3/2008 | Morrison et al. |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0104624 A1 | 5/2008 | Narasimhan et al. |
| 2008/0120661 A1 | 5/2008 | Ludvig et al. |
| 2008/0126420 A1 | 5/2008 | Wright et al. |
| 2008/0133223 A1 | 6/2008 | Son et al. |
| 2008/0133504 A1 | 6/2008 | Messer et al. |
| 2008/0134232 A1 | 6/2008 | Rhoads |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0184132 A1 | 7/2008 | Zato |
| 2008/0209491 A1 | 8/2008 | Hasek |
| 2008/0219496 A1 | 9/2008 | Tewfik et al. |
| 2008/0235077 A1 | 9/2008 | Harkness et al. |
| 2008/0235209 A1 | 9/2008 | Rathod et al. |
| 2008/0240490 A1 | 10/2008 | Finkelstein et al. |
| 2008/0249961 A1 | 10/2008 | Harkness et al. |
| 2008/0263579 A1 | 10/2008 | Mears |
| 2008/0294487 A1 | 11/2008 | Nasser |
| 2008/0310629 A1 | 12/2008 | Van Der Veen et al. |
| 2009/0007169 A1 | 1/2009 | Headley et al. |
| 2009/0055417 A1 | 2/2009 | Hannuksela |
| 2009/0070408 A1 | 3/2009 | White |
| 2009/0083417 A1 | 3/2009 | Hughes et al. |
| 2009/0086812 A1 | 4/2009 | Ducharme |
| 2009/0103887 A1 | 4/2009 | Choi et al. |
| 2009/0119723 A1 | 5/2009 | Tinsman |
| 2009/0129588 A1 | 5/2009 | Takakusu |
| 2009/0150553 A1 | 6/2009 | Collart et al. |
| 2009/0157731 A1 | 6/2009 | Zigler et al. |
| 2009/0158318 A1 | 6/2009 | Levy |
| 2009/0164378 A1 | 6/2009 | West et al. |
| 2009/0164564 A1 | 6/2009 | Willis |
| 2009/0210892 A1 | 8/2009 | Ramaswamy |
| 2009/0228492 A1 | 9/2009 | Valdez et al. |
| 2009/0248886 A1 | 10/2009 | Tan et al. |
| 2009/0259325 A1 | 10/2009 | Topchy et al. |
| 2009/0265214 A1 | 10/2009 | Jobs et al. |
| 2009/0276313 A1 | 11/2009 | Wilhelm |
| 2009/0305680 A1 | 12/2009 | Swift et al. |
| 2009/0307061 A1 | 12/2009 | Monighetti et al. |
| 2009/0307084 A1 | 12/2009 | Monighetti et al. |
| 2010/0008586 A1 | 1/2010 | Meyer et al. |
| 2010/0009722 A1 | 1/2010 | Levy et al. |
| 2010/0023405 A1 | 1/2010 | Liu |
| 2010/0083299 A1 | 4/2010 | Nelson et al. |
| 2010/0088583 A1 | 4/2010 | Schachter |
| 2010/0094897 A1 | 4/2010 | Sumrall et al. |
| 2010/0121936 A1 | 5/2010 | Liu et al. |
| 2010/0135638 A1 | 6/2010 | Mio |
| 2010/0172540 A1 | 7/2010 | Davis et al. |
| 2010/0174774 A1 | 7/2010 | Kern et al. |
| 2010/0226526 A1 | 9/2010 | Modro et al. |
| 2010/0241963 A1 | 9/2010 | Kulis et al. |
| 2010/0246955 A1 | 9/2010 | Wright et al. |
| 2010/0262711 A1 | 10/2010 | Bouazizi |
| 2010/0280641 A1 | 11/2010 | Harkness et al. |
| 2010/0306257 A1 | 12/2010 | Levy |
| 2010/0318600 A1 | 12/2010 | Furbeck |
| 2011/0016231 A1 | 1/2011 | Ramaswamy et al. |
| 2011/0030031 A1 | 2/2011 | Lussier et al. |
| 2011/0055314 A1 | 3/2011 | Rosenstein et al. |
| 2011/0066437 A1 | 3/2011 | Luff |
| 2011/0069230 A1 | 3/2011 | Polumbus et al. |
| 2011/0078721 A1 | 3/2011 | Wang et al. |
| 2011/0088053 A1 | 4/2011 | Lee |
| 2011/0123062 A1 | 5/2011 | Hilu |
| 2011/0145246 A1 | 6/2011 | Prager et al. |
| 2011/0145581 A1 | 6/2011 | Malhotra et al. |
| 2011/0154185 A1 | 6/2011 | Kern et al. |
| 2011/0157475 A1 | 6/2011 | Wright |
| 2011/0173200 A1 | 7/2011 | Yang et al. |
| 2011/0196921 A1 | 8/2011 | Sylthe |
| 2011/0252118 A1 | 10/2011 | Pantos et al. |
| 2011/0320287 A1 | 12/2011 | Holt et al. |
| 2011/0321003 A1 | 12/2011 | Doig et al. |
| 2012/0023516 A1 | 1/2012 | Wolinsky et al. |
| 2012/0036350 A1 | 2/2012 | Kuno et al. |
| 2012/0045054 A1 | 2/2012 | Main et al. |
| 2012/0096546 A1 | 4/2012 | Dilley et al. |
| 2012/0124605 A1 | 5/2012 | Praden |
| 2012/0137015 A1 | 5/2012 | Sun |
| 2012/0209949 A1 | 8/2012 | Deliyannis et al. |
| 2012/0239809 A1 | 9/2012 | Mazumdar |
| 2012/0265735 A1 | 10/2012 | McMillan et al. |
| 2012/0284804 A1 | 11/2012 | Lindquist et al. |
| 2012/0308071 A1 | 12/2012 | Ramsdell et al. |
| 2012/0311126 A1 | 12/2012 | Jadallah et al. |
| 2013/0007298 A1 | 1/2013 | Ramaswamy |
| 2013/0007794 A1 | 1/2013 | Besehanic et al. |
| 2013/0054972 A1 | 2/2013 | Thorwirth |
| 2013/0061275 A1 | 3/2013 | Seo et al. |
| 2013/0073960 A1 | 3/2013 | Eppolito et al. |
| 2013/0097285 A1 | 4/2013 | Van Zwol et al. |
| 2013/0124747 A1 | 5/2013 | Harrang et al. |
| 2013/0166868 A1 | 6/2013 | Jarnikov et al. |
| 2013/0202150 A1 | 8/2013 | Sinha et al. |
| 2013/0205319 A1 | 8/2013 | Sinha et al. |
| 2013/0226942 A1 | 8/2013 | Denoual et al. |
| 2013/0231931 A1 | 9/2013 | Kulis et al. |
| 2013/0247078 A1 | 9/2013 | Nikankin et al. |
| 2013/0268623 A1 | 10/2013 | Besehanic et al. |
| 2013/0268630 A1 | 10/2013 | Besehanic et al. |
| 2013/0290508 A1* | 10/2013 | Besehanic ........ H04N 21/44204 709/224 |
| 2013/0291001 A1 | 10/2013 | Besehanic et al. |
| 2013/0297410 A1 | 11/2013 | Oh et al. |
| 2013/0297737 A1 | 11/2013 | Wajs et al. |
| 2013/0311478 A1 | 11/2013 | Frett |
| 2013/0311776 A1 | 11/2013 | Besehanic |
| 2013/0311780 A1 | 11/2013 | Besehanic |
| 2014/0082220 A1 | 3/2014 | Ramaswamy et al. |
| 2014/0105392 A1 | 4/2014 | Robert et al. |
| 2014/0229629 A1 | 8/2014 | Besehanic |
| 2014/0229970 A1 | 8/2014 | Besehanic |
| 2014/0237498 A1 | 8/2014 | Ivins |
| 2014/0244828 A1 | 8/2014 | Besehanic |
| 2014/0298365 A1 | 10/2014 | Matsubara et al. |
| 2014/0301386 A1 | 10/2014 | Harrenstien et al. |
| 2015/0074129 A1 | 3/2015 | Friedrich et al. |
| 2015/0222939 A1 | 8/2015 | Gallant et al. |
| 2016/0043916 A1 | 2/2016 | Ramaswamy et al. |
| 2016/0127466 A1 | 5/2016 | Albrecht |
| 2017/0374424 A1 | 12/2017 | Besehanic |

FOREIGN PATENT DOCUMENTS

| | | |
|---|---|---|
| AU | 2003230993 | 11/2003 |
| AU | 2006203639 | 9/2006 |
| BR | 112901 | 6/2003 |
| BR | 309598 | 2/2005 |
| CA | 2483104 | 11/2003 |
| CN | 1592906 | 3/2005 |
| CN | 1647160 | 7/2005 |
| CN | 101115124 | 1/2008 |
| EP | 0769749 | 4/1997 |
| EP | 1176826 | 1/2002 |
| EP | 1349370 | 10/2003 |
| EP | 1406403 | 4/2004 |
| EP | 1307833 | 6/2006 |
| EP | 1745464 | 10/2007 |
| EP | 1853026 | 11/2007 |
| EP | 1704695 | 2/2008 |
| EP | 1504445 | 8/2008 |
| JP | 2002247610 | 8/2002 |
| JP | 2003524199 | 8/2003 |
| JP | 2004320752 | 11/2004 |

(56) References Cited

FOREIGN PATENT DOCUMENTS

| | | |
|---|---|---|
| WO | 9527349 | 10/1995 |
| WO | 9702672 | 1/1997 |
| WO | 0004662 | 1/2000 |
| WO | 0019699 | 4/2000 |
| WO | 0119088 | 3/2001 |
| WO | 0124027 | 4/2001 |
| WO | 0131497 | 5/2001 |
| WO | 0140963 | 6/2001 |
| WO | 0146782 | 6/2001 |
| WO | 0153922 | 7/2001 |
| WO | 0175743 | 10/2001 |
| WO | 0191109 | 11/2001 |
| WO | 0205517 | 1/2002 |
| WO | 03009277 | 1/2002 |
| WO | 0211123 | 2/2002 |
| WO | 0215081 | 2/2002 |
| WO | 0217591 | 2/2002 |
| WO | 0219625 | 3/2002 |
| WO | 0227600 | 4/2002 |
| WO | 0237381 | 5/2002 |
| WO | 0245034 | 6/2002 |
| WO | 02061652 | 8/2002 |
| WO | 02065305 | 8/2002 |
| WO | 02065318 | 8/2002 |
| WO | 02069121 | 9/2002 |
| WO | 03091990 | 11/2003 |
| WO | 03094499 | 11/2003 |
| WO | 03096337 | 11/2003 |
| WO | 2004010352 | 1/2004 |
| WO | 2004040416 | 5/2004 |
| WO | 2004040475 | 5/2004 |
| WO | 2004061699 | 7/2004 |
| WO | 2005025217 | 3/2005 |
| WO | 2005064885 | 7/2005 |
| WO | 2005101243 | 10/2005 |
| WO | 2005111998 | 11/2005 |
| WO | 2006012241 | 2/2006 |
| WO | 2006025797 | 3/2006 |
| WO | 2007056531 | 5/2007 |
| WO | 2007056532 | 5/2007 |
| WO | 2008042953 | 4/2008 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |
| WO | 2010095320 | 8/2010 |
| WO | 2010127268 | 11/2010 |
| WO | 2012177866 | 12/2012 |
| WO | 2012177870 | 12/2012 |
| WO | 2012177872 | 12/2012 |
| WO | 2012177874 | 12/2012 |

OTHER PUBLICATIONS

United States Patent and Trademark Office, "Final Office Action", issued in connection with U.S. Appl. No. 13/181,147, dated Dec. 3, 2015, 10 pages.

IP Australia, "Notice of Grant," issued in connection with Application No. 2012272872, dated Dec. 3, 2015, 1 page.

United States Patent and Trademark Office, "Notice of Allowance", issued in connection with U.S. Appl. No. 13/767,548, dated Dec. 4, 2015, 9 pages.

United States Patent and Trademark Office, "Non-Final Office Action", issued in connection with U.S. Appl. No. 13/778,108, dated Jan. 8, 2016, 13 pages.

United States Patent and Trademark Office, "Notice of Allowance", issued in connection with U.S. Appl. No. 13/793,959, dated Jan. 26, 2016, 9 pages.

United States Patent and Trademark Office, "Non-Final Office Action", issued in connection with U.S. Appl. No. 13/341,661, dated Feb. 1, 2016, 8 pages.

Japanese Patent Office, "Notice of Reasons for Rejection", issued in connection with Japanese Patent Application No. P2014-517158, dated Jan. 26, 2016, 4 pages.

United States Patent and Trademark Office, "Notice of Allowance" issued in connection with U.S. Appl. No. 13/181,147, dated Feb. 18, 2016, 8 pages.

United States Patent and Trademark Office, "Non-Final Office Action", issued in connection with U.S. Appl. No. 14/922,918, dated Feb. 23, 2016, 17 pages.

Canadian Intellectual Property Office, "Office Action", issued in connection with Canadian Patent Application No. 2,773,567, dated Mar. 9, 2016, 4 pages.

United States Patent and Trademark Office, "Final Office Action", issued in connection with U.S. Appl. No. 13/455,961, dated Mar. 23, 2016, 17 pages.

United States Patent and Trademark Office, "Final Office Action", issued in connection with U.S. Appl. No. 13/443,596, dated Apr. 6, 2016, 25 pages.

European Patent Office, "Communication Pursuant to Article 94(3) EPC," issued in connection with application No. 12002599.4 dated Mar. 4, 2016, 4 pages.

United States Patent and Trademark Office, "Final Office Action", issued in connection with U.S. Appl. No. 13/793,991, dated Apr. 8, 2016, 23 pages.

IP Australia, "Notice of Acceptance", issued in connection with Australian Patent Application No. 2013204488, dated Apr. 26, 2016, 3 pages.

IP Australia, "Examination Report", issued in connection with Australian Patent Application No. 2012272876, dated Apr. 26, 2016, 3 pages.

United States Patent and Trademark Office, "Non-Final Office Action", issued in connection with U.S. Appl. No. 14/089,279, dated May 5, 2016, 29 pages.

United States Patent and Trademark Office, "Final Office Action", issued in connection with U.S. Appl. No. 13/793,974, dated May 23, 2016, 14 pages.

United States Patent and Trademark Office, "Final Office Action", issued in connection with U.S. Appl. No. 13/778,108, dated May 23, 2016, 13 pages.

The State Intellectual Property Office of China, "Office Action", issued in connection with Chinese Patent Application No. 201280032740.2, dated May 31, 2016, 22 pages.

IP Australia, "Notice of Acceptance", issued in connection with Australian Patent Application No. 2012272876, dated Jun. 6, 2016, 2 pages.

United States Patent and Trademark Office, "Notice of Allowance", issued in connection with U.S. Appl. No. 13/341,661, dated Aug. 19, 2016, 9 pages.

United States Patent and Trademark Office, "Non-Final Office Action", issued in connection with U.S. Appl. No. 14/922,918, dated Sep. 9, 2016, 16 pages.

IP Australia, "Examination Report", issued in connection with Australian Patent Application No. 2015252031, dated Oct. 21, 2016, 3 pages.

United States Patent and Trademark Office, "Notice of Allowance", issued in connection with U.S. Appl. No. 14/089,279, dated Nov. 14, 2016, 13 pages.

The State Intellectual Property Office of China, "First Office Action", issued in connection with Chinese Patent Application No. 201280032738.5, dated Dec. 16, 2016, 13 pages.

United States Patent and Trademark Office, "Non-Final Office Action", issued in connection with U.S. Appl. No. 15/181,399, dated Aug. 9, 2016, 44 pages.

United States Patent and Trademark Office, "Notice of Allowance", issued in connection with U.S. Appl. No. 15/181,399, dated Jan. 27, 2017, 22 pages.

United States Patent and Trademark Office, "Corrected Notice of Allowability", issued in connection with U.S. Appl. No. 15/181,399, dated Feb. 16, 2017, 7 pages.

United States Patent and Trademark Office, "Non-Final Office Action", issued in connection with U.S. Appl. No. 15/331,568, dated Feb. 24, 2017, 9 pages.

(56) References Cited

OTHER PUBLICATIONS

Windows Internet Explorer, "Video: timed text tracks", Microsoft, 2012, http://msdn.microsoft.com/en-us/library/ie/hh673566(v=vs.85).aspx, 6 pages.
R. Pantos, Ed., & W. May, Apple Inc. "HTTP Live Streaming: draft-pantos-http-live-streaming-07", Sep. 2011, 33 pages.
Apple Inc. "Timed Metadata for HTTP Live Streaming", Apr. 28, 2011, 12 pages.
Apple Inc. "HTTP Live Streaming Overview", Apr. 1, 2011, 36 pages.
Eric Winkelman, "Timed Text Tracks and TV Services", Aug. 15, 2011, 5 pages.
"What is Jacked?," http://www.jacked.com/, retrieved on Dec. 3, 2009, 1 page.
Anderson, "Google to compete with Nielsen for TV-ratings info?," ARS Technica, Jun. 19, 2006, 3 pages.
Boehret, "Yahoo Widgets Lend Brains to Boob Tube," The Wall Street Journal, Mar. 25, 2009, 4 pages.
Claburn, "Google Researchers Propose TV Monitoring," Information Week, Jun. 7, 2006, 4 pages.
Evain, "TV—Anytime Metadata—A Preliminary Specification on Schedule!," EBU Technical Review, Sep. 2000, 15 pages.
Fink et al., "Social- and Interactive-Television Applications Based on Real-Time Ambient-Audio Identification," EuroITV, 2006, 10 pages.
Heuer et al., "Adaptive Multimedia Messaging based on MPEG-7—The M3-Box," Proc. Second Int'l Symposium on Mobile Multimedia Systems Applications, Nov. 9-10, 2000, 8 pages.
Heussner, "Sound-Triggered Smart Phone Ads Seek You Out," Adweek.com, http://www.adweek.com/news/advertising-branding/sound-triggered-smartphon-e-ads-seek-you-out-136901, Dec. 7, 2011, 3 pages.
Hopper, "EBU Project Group P/META Metadata Exchange Standards," EBU Technical Review, Sep. 2000 [http://www.ebu.ch/en/technical/trev/trev.sub.--284-contents.html, retrieved on Jul. 20, 2006], 25 pages.
Kane, "Entrepreneur Plans On-Demand Videogame Service," The Wall Street Journal, Mar. 24, 2009, 2 pages.
Laven,"EBU Technical Review (Editorial)," No. 284, Sep. 2000 [http://www.ebu.ch/en/technical/trev/trev.sub.--284-contents.html, retrieved on Jul. 20, 2006], 3 pages.
Mulder, "The Integration of Metadata From Production to Consumer," EBU Technical Review, Sep. 2000 [http://www.ebu.ch/en/technical/trev/trev.sub.--284-contents.html, retrieved on Jul. 20, 2006], 6 pages.
Canadian Intellectual Proprty Office, "Office Action," issued in connection with Canadian Application Serial No. 2,574,998, dated Aug. 26, 2008, 4 pages.
Canadian Intellectual Proprty Office, "Office Action," issued in connection with Canadian Application Serial No. 2,574,998, dated Mar. 23, 2009, 5 pages.
Canadian Intellectual Proprty Office, "Office Action," issued in connection with Canadian Application Serial No. 2,574,998, dated Nov. 13, 2009, 10 pages.
Patent Cooperation Treaty, "International Search Report," issued in connection with International Application Serial No. PCT/US2003/14970, dated Feb. 10, 2004, 1 page.
Patent Cooperation Treaty, "International Preliminary Examination Report," issued in connection with International Application Serial No. PCT/US2003/014970, completed Aug. 21, 2004, 6 pages.
Patent Cooperation Treaty, "International Search Report," issued in connection with International Application Serial No. PCT/US2003/031180, dated Jun. 8, 2004, 5 pages.
Patent Cooperation Treaty, "International Preliminary Examination Report," issued in connection with International Application Serial No. PCT/US2003/031180, dated Aug. 17, 2004, 4 pages.
Patent Cooperation Treaty, "International Search Report and Written Opinion," issued in connection with International Application Serial No. PCT/US2005/026426, dated Aug. 18, 2006, 10 pages.
Patent Cooperation Treaty, "International Preliminary Report on Patentability," issued in connection with International Application Serial No. PCT/US2005/026426, dated Feb. 1, 2007, 9 pages.
Patent Cooperation Treaty, "International Search Report and Written Opinion," issued in connection with International Application Serial No. PCT/US2009/061827, dated Mar. 15, 2010, 12 pages.
Patent Cooperation Treaty, "International Search Report and Written Opinion," issued in connection with International Application Serial No. PCT/US2009/061750, dated Mar. 9, 2010, 10 pages.
Patent Cooperation Treaty, International Search Report and Written Opinion, issued in connection with International Application Serial No. PCT/US2010/033201, dated Oct. 1, 2010, 16 pages.
Patent Cooperation Treaty, "International Search Report and Written Opinion," issued in connection with International Application Serial No. PCT/US2009/061749, dated May 26, 2010, 15 pages.
Patent Cooperation Treaty, "International Search Report and Written Opinion", issued in connection with International application No. PCT/US2012/043546, dated Dec. 10, 2012, 6 pages.
Patent Cooperation Treaty, "International Search Report and Written Opinion", issued in connection with International application No. PCT/US2012/043539, dated Jan. 17, 2013, 9 pages.
Patent Cooperation Treaty, "International Search Report and Written Opinion", issued in connection with International application No. PCT/US2012/043544, dated Jan. 31, 2013, 15 pages.
Shazam, "Shazam and VidZone Digital Media announce UK1s first fixed price mobile download service for music videos," http://www.shazam.com/music/web/newsdetail.html?nid=NEWS136, Feb. 11, 2008, 1 page.
Shazam, "Shazam launches new music application for Facebook fans," http://www.shazam.com/music/web/newsdetail.html?nid=NEWS135, Feb. 18, 2008, 1 page.
Shazam, "Shazam turns up the vol. On mobile music," http://www.shazam.com/music/web/newsdetail.html?nid=NEWS137, Nov. 28, 2007, 1 page.
Shazam, Company summary outline and list of products, undated, 1 page.
Stross, "Apple Wouldn't Risk Its Cool Over a Gimmick, Would It?," The New York Times, Nov. 14, 2009, 3 pages.
Stultz, "Handheld Captioning at Disney World Theme Parks," article retrieved on Mar. 8, 2013, [http://goflorida.about.com/od/disneyworld/a/wdw.sub.--captioning.htm], 1 page.
Sullivan, "Google Cozies Up to SMBs for Digital Content," MediaPost News, Mar. 19, 2009, 3 pages.
U.S. Appl. No. 61/499,520, filed Jun. 21, 2011, 51 pages.
U.S. Appl. No. 61/568,631, filed Dec. 8, 2011, 80 pages.
United States Patent and Trademark Office, "Advisory Action," issued in connection with U.S. Appl. No. 10/540,611, dated Jan. 22, 2010, 4 pages.
Canadian Intellectual Property Office, "Notice of Allowance," issued in connection with application No. 2,773,567, dated Mar. 30, 2017, 1 page.
European Patent Office, "Examination Report," issued in connection with European Application No. 12 802 746.3, dated Feb. 23, 2017, 6 pages.
United States Patent and Trademark Office, "Non-Final Office Action", issued in connection with U.S. Appl. No. 13/455,961, dated Dec. 5, 2014, 13 pages.
United States Patent and Trademark Office, "Notice of Allowance", issued in connection with U.S. Appl. No. 13/472,170, dated Dec. 5, 2014, 12 pages.
United States Patent and Trademark Office, "Non-Final Office Action", issued in connection with U.S. Appl. No. 13/793,991, dated Nov. 10, 2014, 19 pages.
United States Patent and Trademark Office, "Notice of Allowance", issued in connection with U.S. Appl. No. 13/793,983, dated Jan. 9, 2015, 12 pages.
United States Patent and Trademark Office, "Notice of Allowance," issued in connection with U.S. Appl. No. 12/890,216 dated Aug. 6, 2013, 14 pages.
United States Patent and Trademark Office, "Office Action," issued in connection with U.S. Appl. No. 13/181,147 dated Aug. 15, 2013, 46 pages.

(56) References Cited

OTHER PUBLICATIONS

United States Patent and Trademark Office, "Office Action," issued in connection with U.S. Appl. No. 13/472,170 dated Nov. 8, 2013, 17 pages.
United States Patent and Trademark Office, "Office Action," issued in connection with U.S. Appl. No. 13/793,983 dated Nov. 8, 2013, 13 pages.
United States Patent and Trademark Office, "Office Action," issued in connection with U.S. Appl. No. 13/443,596 dated Nov. 21, 2013, 25 pages.
United States Patent and Trademark Office, "Office Action," issued in connection with U.S. Appl. No. 13/793,991 dated Dec. 6, 2013, 21 pages.
Patent Cooperation Treaty, "International Search Report and Written Opinion," issued in connection with International application No. PCT/ US2012/043535, dated Feb. 21, 2013, 15 pages.
United States Patent and Trademark Office, "Notice of Allowance," issued in connection with U.S. Appl. No. 13/341,661 dated Sep. 23, 2013, 9 pages.
Canadian Intellectual Property Office, "Office Action," issued in connection with application No. CA 2,773,567, dated Mar. 6, 2014, 2 pages.
State Intellectual Property Office of China, "First Office Action," issued in connection with application No. CN 201210105474.3, dated Feb. 8, 2014, 15 pages.
United States Patent and Trademark Office, "Final Office Action", issued in connection with U.S. Appl. No. 13/181,147, dated Mar. 10, 2014, 48 pages.
United States Patent and Trademark Office, "Final Office Action", issued in connection with U.S. Appl. No. 13/443,596, dated Apr. 9, 2014, 20 pages.
United States Patent and Trademark Office "Final Office Action", issued in connection with U.S. Appl. No. 13/793,991, dated Apr. 11, 2014, 15 pages.
United States Patent and Trademark Office, "Non-Final Office Action", issued in connection with U.S. Appl. No. 13/341,646, dated Jun. 5, 2014, 17 pages.
United States Patent and Trademark Office, "Final Office Action", issued in connection with U.S. Appl. No. 13/793,983, dated Jun. 6, 2014, 13 pages.
United States Patent and Trademark Office, "Final Office Action", issued in connection with U.S. Appl. No. 13/472,170, dated Jun. 18, 2014, 18 pages.
IP Australia, "Examination Report", issued in connection with Australian Patent Application No. 2012272868, dated Jun. 27, 2014, 3 pages.
IP Australia, "Examination Report", issued in connection with Australian Patent Application No. 2012272874, dated Jun. 27, 2014, 3 pages.
IP Australia, "Examination Report", issued in connection with Australian Patent Application No. 2012272872, dated Jun. 24, 2014, 4 pages.
International Bureau, "International Preliminary Report on Patentability" issued in connection with International Application No. PCT/US2012/043544, dated Jan. 9, 2014, 9 pages.
United States Patent and Trademark Office, "Notice of Allowance", issued in connection with U.S. Appl. No. 13/341,661 dated Jul. 8, 2014, 8 pages.
United States Patent and Trademark Office, "Non-Final Office Action," issued in connection with U.S. Appl. No. 13/341,661, dateded Mar. 19, 2013, 10 pages.
United States Patent and Trademark Office, "Restriction," issued in connection with U.S. Appl. No. 13/181,147, dated Aug. 10, 2012, 4 pages.
United States Patent and Trademark Office, "Non-Final Office Action," issued in connection with U.S. Appl. No. 13/181,147, dated Nov. 21, 2012, 30 pages.
U.S. Appl. No. 13/443,596, filed Apr. 10, 2012, 50 pages.
United States Patent and Trademark Office, "Non-Final Office Action", issued in connection with U.S. Appl. No. 13/778,108, dated Feb. 27, 2015, 66 pages.
United States Patent and Trademark Office, "Notice of Allowance", issued in connection with U.S. Appl. No. 13/341,646, dated Jun. 19, 2015, 27 pages.
United States Patent and Trademark Office, "Notice of Allowance", issued in connection with U.S. Appl. No. 13/472,170, dated Jul. 7, 2015, 22 pages.
United States Patent and Trademark Office, "Notice of Allowance", issued in connection with U.S. Appl. No. 13/793,983, dated Jul. 7, 2015, 10 pages.
European Patent Office, "European Search Report" issued in connection with European Patent Application No. 12802202.7 dated May 28, 2015, 7 pages.
IP Australia, "Notice of Acceptance", issued in connection with Australian Patent Application No. 2012272868, dated Jul. 22, 2015, 2 pages.
United States Patent and Trademark Office, "Final Office Action," issued in connection with U.S. Appl. No. 10/540,611, dated Sep. 29, 2009, 36 pages.
United States Patent and Trademark Office, "Non-Final Office Action," issued in connection with U.S. Appl. No. 10/540,611, dated Mar. 4, 2009, 33 pages.
United States Patent and Trademark Office, "Non-Final Office Action," issued in connection with U.S. Appl. No. 10/540,611, dated Sep. 15, 2008, 22 pages.
United States Patent and Trademark Office, "Non-Final Office Action," issued in connection with U.S. Appl. No. 12/890,216, dated Apr. 2, 2012, 33 pages.
United States Patent and Trademark Office, "Notice of Allowance," issued in connection with U.S. Appl. No. 10/540,611, dated Jun. 22, 2010, 26 pages.
United States Patent and Trademark Office, "Advisory Action," issued in connection with U.S. Appl. No. 11/618,245, dated Sep. 30, 2009, 4 pages.
United States Patent and Trademark Office, "Final Office Action," issued in connection with U.S. Appl. No. 10/530,233, dated Mar. 18, 2010, 23 pages.
United States Patent and Trademark Office, "Final Office Action," issued in connection with U.S. Appl. No. 11/618,245, dated Jul. 21, 2009, 31 pages.
United States Patent and Trademark Office, "Non-Final Office Action," issued in connection with U.S. Appl. No. 10/530,233, datled Sep. 16, 2009, 31 pages.
United States Patent and Trademark Office, "Non-Final Office Action," issued in connection with U.S. Appl. No. 11/618,245, dated Feb. 5, 2009, 48 pages.
Van Beek et al., "Metadata-Driven Multimedia Access," IEEE Signal Processing Magazine, vol. 20, No. 2, Institute of Electric and Electronic Engineers, Inc., New York, New York, USA, Mar. 2003, 13 pages.
Vetro et al., "Video Transcoding Architectures and Techniques: an Overview," IEEE Signal Processing Magazine, vol. 20, No. 2, Institute of Electric and Electronics Engineers, Inc. New York, New York, USA, Mar. 2003, 12 pages.
Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002, 14 pages.
Wang, "An Industrial-Strength Audio Search Algorithm," Shazam Entertainment, Ltd., in Proceedings of the Fourth International Conference on Music Information Retrieval, Baltimore, Oct. 26-30, 2003, 7 pages.
United States Patent and Trademark Office, "Non-Final Office Action," issued in connection with U.S. Appl. No. 12/890,216, dated Nov. 29, 2012, 22 pages.
United States Patent and Trademark Office, "Requirement for Restriction," issued in connection with U.S. Appl. No. 10/530,233, dated Jun. 10, 2009, 20 pages.
United States Patent and Trademark Office, "Non-Final Office Action," issued in connection with U.S. Appl. No. 11/618,245, dated Apr. 28, 2011, 48 pages.

(56) References Cited

OTHER PUBLICATIONS

United States Patent and Trademark Office, "Final Office Action," issued in connection with U.S. Appl. No. 11/618,245, dated Oct. 26, 2011, 38 pages.
United States Patent and Trademark Office, "Final Office Action", issued in connection with U.S. Appl. No. 13/793,974, dated May 28, 2015, 13 pages.
Canadian Intellectual Property Office, "Office Action", issued in connection with Canadian Patent Application No. 2,840,094, dated May 19, 2015, 4 pages.
United States Patent and Trademark Office, "Non-Final Office Action", issued in connection with U.S. Appl. No. 14/089,279, dated Mar. 28, 2014, 13 pages.
United States Patent and Trademark Office, "Final Office Action", issued in connection with U.S. Appl. No. 14/089,279, dated Nov. 21, 2014, 22 pages.
United States Patent and Trademark Office, "Non-Final Office Action", issued in connection with U.S. Appl. No. 14/089,279, dated Apr. 23, 2015, 23 pages.
European Patent Office, "European Search Report", issued in connection with European Patent Application No. 12802805.7, dated May 27, 2015, 8 pages.
European Patent Office, "European Search Report", issued in connection with European Patent Application No. 12802746.3, dated May 27, 2015, 9 pages.
United States Patent and Trademark Office, "Final Office Action", issued in connection with U.S. Appl. No. 13/455,961, dated May 20, 2015, 14 pages.
State Intellectual Property Office of China, "Notice of Allowance" issued in connection with Application No. 201210105474.3, dated May 25, 2015, 5 pages.
European Patent Office, "European Search Report", issued in connection with European Patent Application No. 12803215.8, dated Apr. 20, 2015, 9 pages. (not provided—Document available in U.S. Appl. No.'s 15/701,397.).
Canadian Patent Office, "Office Action", issued in connection with Canadian Patent Application No. 2,840,092, dated Apr. 20, 2015, 4 pages.
United States Patent and Trademark Office, "Final Office Action", issued in connection with U.S. Appl. No. 13/793,991, dated Feb. 27, 2015, 21 pages.
United States Patent and Trademark Office, "Non-Final Office Action", issued in connection with U.S. Appl. No. 13/341,646, dated Mar. 3, 2015, 7 pages.
Japanese Patent Office, "Notice of Reasons for Rejection", issued in connection with Japanese Patent Application No. P2014-517158, dated Mar. 3, 2015, 7 pages.
United States Patent and Trademark Office, "Notice of Allowance", issued in connection with U.S. Appl. No. 13/793,983, dated Mar. 16, 2015, 9 pages.
United States Patent and Trademark Office, "Notice of Allowance", issued in connection with U.S. Appl. No. 13/472,170, dated Mar. 26, 2015, 10 pages.
United States Patent and Trademark Office, "Final Office Action", issued in connection with U.S. Appl. No. 13/341,661, dated Mar. 26, 2015, 13 pages.
United States Patent and Trademark Office, "Non-Final Office Action", issued in connection with U.S. Appl. No. 13/793,974, dated Feb. 18, 2015, 12 pages.
Mexican Patent Office, "Office Action", issued in connection with Mexican Patent Application No. MX/a/2014/000280, dated Jan. 21, 2015, 5 pages, English translation included.
United States Patent and Trademark Office, "Corrected Notice of Allowance", issued in connection with U.S. Appl. No. 13/472,170, dated Feb. 12, 2015, 5 pages.
United States Patent and Trademark Office, "Final Office Action", issued in connection with U.S. Appl. No. 13/443,596, dated Feb. 26, 2015, 25 pages.
United States Patent and Trademark Office, "Non-Final Office Action", issued in connection with U.S. Appl. No. 13/793,959 dated Jan. 30, 2015, 11 pages.
United States Patent and Trademark Office, "Non-Final Office Action", issued in connection with U.S. Appl. No. 13/767,548, dated Feb. 3, 2015, 10 pages.
United States Patent and Trademark Office, "Examiner's Answer to Appeal Brief", issued in connection with U.S. Appl. No. 13/181,147, dated Dec. 22, 2014, 34 pages.
IP Australia, "Examination Report", issued in connection with Australian Patent Application No. 2013204488, dated Aug. 12, 2014, 5 pages.
IP Australia, "Examination Report", issued in connection with Australian Patent Application No. 2013203778, dated Aug. 21, 2014, 5 pages.
IP Australia, "Examination Report", issued in connection with Australian Patent Application No. 2012272876, dated Sep. 18, 2014, 4 pages.
United States Patent and Trademark Office, "Non-Final Office Action", issued in connection with U.S. Appl. No. 13/443,596, dated Sep. 25, 2014, 22 pages.
United States Patent and Trademark Office, "Notice of Allowance", issued in connection with U.S. Appl. No. 13/341,646, dated Nov. 3, 2014, 10 pages.
United States Patent and Trademark Office, "Non-Final Office Action", issued in connection with U.S. Appl. No. 15/466,547, dated May 5, 2017, 11 pages.
United States Patent and Trademark Office, "Examiner's Answer to the Appeal Brief", issued in connection with U.S. Appl. No. 13/778,108, dated May 5, 2017, 24 pages.
United States Patent and Trademark Office, "Non-Final Office Action," issued in connection with U.S. Appl. No. 14/725,877, dated Jan. 26, 2017, 14 pages.
United States Patent and Trademark Office, "Notice of Allowance," issued in connection with U.S. Appl. No. 14/725,877, dated May 5, 2017, 10 pages.
United States Patent and Trademark Office, "Non-final Office Action," issued in connection with U.S. Appl. No. 15/701,397, dated Aug. 27, 2018, 9 pages.
United States Patent and Trademark Office, "Notice of Allowance," issued in connection with U.S. Appl. No. 15/701,397, dated Jan. 8, 2019, 8 pages.

* cited by examiner

```
<script src="jquery-1.7.1-binary-ajax.js"></script>
<script src="jdataview.js"></script>

<script>
var myVideo = document.getElementsByTagName('video')[0];
var videoIndex = 0;
function myEndedListener(){
        videoIndex++;
        myVideo.src="examplemedia_"+videoindex+".m4v";
        myVideo.removeEventListener('ended',myEndedListener,false);
        myVideo.load();
        myVideo.play();
        myVideo.addEventListener('ended',myEndedListener,false);
    }
var duration_0 = 0;

function id3(view) {
        metatag = view.search("www.nielsen.com");
        view.seek(metatag);
        var stringski = view.getString(view.length()-metatag);
        var arrayski = stringski.split("\n");

setInterval(function(){
                var tiem=Math.floor($('#videoarea').get(0).currentTime);
                var urlski = $('#videoarea').get(0).currentSrc;
                var duration=Math.floor($('#videoarea').get(0).duration);
                var video_name = "examplemedia_";

if (urlski.indexOf(video_name+"0")!=-1) {
                duration_0= duration_0 + duration;
                }
                if (urlski.indexOf(video_name)!=-1) {
                        if (urlski.indexOf(video_name+"1")!=-1) {
                        totaltiem = tiem + duration_0;
                        console.log(tiem); } if (totaltiem%10==0) {
                        out.value = arrayski[totaltiem/10]; }
                }
        }, 1000)

$.get('video.m4v', id3, 'dataview');
</script>

<body onload="myEndedListener()">
<video id="videoarea" src="examplemedia_0.m4v" type="video/mp4"
width="480" height="272" autoplay controls></video>
</body>
```

405 www.nielsen.com/X100zdClGellgZnkYj6UvQ==/HBRFQgJPM3Vtn8LbOcngug==/
iDQCGi4tGuINy5IRX7J1RdCssbEOAudi2btt6mwoF3vAg98H6egEmA1WzjpBss4PMDRjSk_9LH1_aZ3yYhAU6h2ClyMFlOOU
3NSex927Mc5yTIfXTtTN0lgZ4iWBmeRippS9X100zdClGellgZnkYj6UvVMM4_hTDOQCOUY=/0000/38520/00
www.nielsen.com/X100zdClGellgZnkYj6UvQ==/HBRFQgJPM3Vtn8LbOcngug==/ ← 410
iDUCxY7UvdLnTHySuTwrLYPgFwdVcSwSKvrZRUIagiyxBIY_tItK3-LwiKjvhpcj-
jEeM6hhUTPJ9340wLg9tNsrAOKVjX69YnH6Kd9YNpcKVD-
U467SZRGclEB_Wdu_RDN5dcPHoStwDt9RFJMer5821lMM5AJTDOQIObM=/00000/38526/00 www.nielsen.com/ ← 415
X100zdClGellgZnkYj6UvQ==/HBRFQgJPM3Vtn8LbOcngug==/iDYC40Avdk2xxiYuvNTGgUZcoxoOYxkCPVP5-
tbXMZMQVbks5kjeJMtb-kXSbLf-9RIDy-
QE_ojqE43wTbsxcL7ae7TC6ACwxkSvhq4PCVng8aQEF0KWUjam2epzbF9aKI8R98AIpNKFZeV-
DsWB1ml2FMM5AhTDOQOO5c=/0000/38532/00 www.nielsen.com/X100zdClGellgZnkYj6UvQ==/ ← 420
HBRFQgJPM3Vtn8LbOcngug==/iDcCh3Y7dJ0i4NEES5zPrjzQ-
N1R9CEhFtU1aJQQ9F4sdeTuZ6_UNLnAVyZG_sprJymUb2UicKvs2xmY-
_5blISDFS7HePdFbENpDcFsVMXFxPs_m_SNUykhhns-wOKyJi5DyEvwWRoioLQyzlqCPA0vvVMM5A5TDOQVOw==/
00000/38540/00 www.nielsen.com/X100zdClGellgZnkYj6UvQ==/HBRFQgJPM3Vtn8LbOcngug==/ ← 425
iDgC2vT425VckkKZKhuw4k-
gdjle8jQSbfiL4zrANLFZUqaaKX89dR56QnCuZJiyniFf9YvCzwNV1W5tZcDYgZWpI2rIRPxjcRzEGJH2LC-u4KLg-
snacZ72AxXTwV13_nv2dcPHoStwDt9RFJMer5821lMM5BVTDOQbPkc=/00000/38545/00 www.nielsen.com/ ← 430
X100zdClGellgZnkYj6UvQ==/HBRFQgJPM3Vtn8LbOcngug==/iDKCF_QHitg6rWw0aPcAbhHe-
7myLmjfR8ElkaPW0pPsBnazPJzVVl2xia6qNhxst7TLGJg7sNn9u2GQ8G3irexttyEZV0wM_tgxygi4wulefAwMK9VLoS0V
xn2iwkyQE9XFu4VmR2SOr8koTAjScHbtiVMM5BtTDOQgPQg=/00000/38550/00

FIG. 4

METHODS AND APPARATUS TO MEASURE EXPOSURE TO STREAMING MEDIA

RELATED APPLICATIONS

This patent arises from a continuation of U.S. patent application Ser. No. 15/701,397, filed on Sep. 11, 2017, and entitled "METHODS AND APPARATUS TO MEASURE EXPOSURE TO STREAMING MEDIA," which is a continuation of U.S. patent application Ser. No. 14/725,877, filed on May 29, 2015, and entitled "METHODS AND APPARATUS TO MEASURE EXPOSURE TO STREAMING MEDIA." Priority to U.S. patent application Ser. Nos. 15/701,397 and 14/725,877 is claimed. U.S. patent application Ser. Nos. 15/701,397 and 14/725,877 are hereby incorporated herein by reference in their entireties.

FIELD OF THE DISCLOSURE

This disclosure relates generally to measuring media exposure, and, more particularly, to methods and apparatus to measure exposure to streaming media.

BACKGROUND

Streaming enables media to be delivered to and presented by a wide variety of media presentation devices, such as desktop computers, laptop computers, tablet computers, personal digital assistants, smartphones, set top boxes, game consoles, etc. A significant portion of media (e.g., content and/or advertisements) is presented via streaming to such devices.

BRIEF DESCRIPTION OF THE DRAWINGS

FIG. 3 illustrates example Hypertext Markup Language (HTML) instructions representing a webpage that may be displayed by the media monitor of FIG. 2 when included in the client device of FIG. 1.

FIG. 4 illustrates example metadata included in a media file presented that may be monitored by the media monitor of FIG. 1.

The figures are not to scale. Wherever appropriate, the same reference numbers will be used throughout the drawing(s) and accompanying written description to refer to the same or like parts.

DETAILED DESCRIPTION

Figure 1:
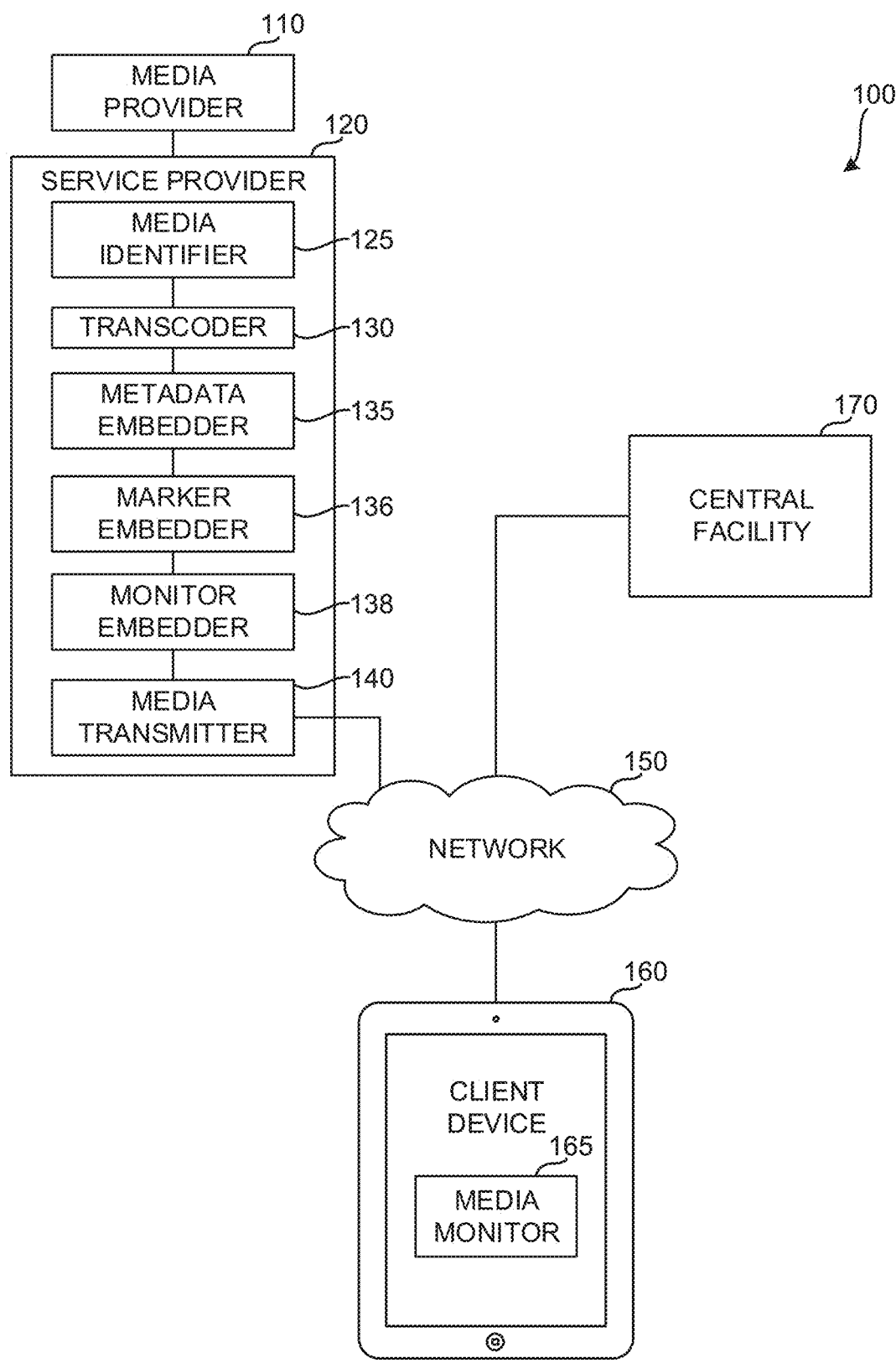
FIG. 1 is a diagram of an example system for measuring exposure to streaming media.

Examples disclosed herein monitor media presentations occurring at client devices. Conventional media monitoring systems either are not capable of monitoring a playback position within primary media when secondary media is inserted mid-stream, or require specialized monitoring software to be installed at a monitored device that limit the number of monitored devices that can be monitored and/or impact performance of such monitored devices. For instance, conventional media monitoring systems that do not have monitoring software installed may monitor a first portion of primary media, such as an episode of a television show being viewed in a browser application. However, when the conventional monitoring system encounters secondary media, such as an inserted advertisement used by the publisher to monetize the primary media, when the primary media resumes playback the conventional monitoring system loses track of a playback position within the entirety of the primary media and may incorrectly reset the playback position by using a playback position within a current media file. As a result, the playback position for parts of the media being presented after the inserted secondary media are incorrectly represented or not represented at all, despite those parts of the media actually being presented on the monitored device.

As used herein, the playback position refers to a time instant within the media with respect to the beginning of linear, non-time scaled playback of the media. For example, the 10 second playback position is located by playing the media from the beginning for 10 seconds at a 1:1 playback speed (i.e., 1 second of intended media duration takes 1 second to play using a media presentation device). Playback positions may be repeatedly played if, for example, a first position (e.g., 10 seconds) is traversed during playback of the media, and the playback position is adjusted to a second position (e.g., 5 seconds) prior to the first position (e.g., 10 seconds), and playback is restarted for enough time (e.g., 5 seconds or more) to traverse the first position (e.g., 10 seconds) again.

Examples disclosed herein provide media monitoring for a larger set of devices than in conventional monitoring, including devices with which a monitoring entity does not have a prior agreement or relationship, while enabling the media monitoring to determine a playback position within primary media despite the insertion of secondary media. Examples disclosed herein accurately track a playback position within primary media, even when the primary media is interrupted by secondary media and/or when the primary media is broken up into multiple files.

Examples disclosed herein collect demographic information associated with users of client devices based on identifiers (e.g., an Internet protocol (IP) address, a cookie, a device identifier, etc.) associated with those client devices. Media exposure information may then be generated based on media metadata and user demographics to indicate exposure metrics and/or demographic reach metrics for at least one of a genre, an artist, an album name, a transmitting station/server site, etc.

Some disclosed examples may be used to link demographics to the monitoring information. To link demographics to monitoring information, the audience measurement entity establishes a panel of users who have agreed to provide their demographic information and to have their streaming media activities monitored. When an individual joins the panel, they provide detailed information concerning their identity and demographics (e.g., gender, race, income, home location, occupation, etc.) to the audience measurement entity. The audience measurement entity sets a cookie (e.g., a panelist cookie) on the presentation device that enables the audience measurement entity to identify the panelist whenever the panelist accesses streamed media.

Example methods, apparatus, systems, and articles of manufacture disclosed herein may also be used to generate reports indicative of media exposure metrics on one or more different types of client devices (e.g., personal computers, portable devices, mobile phones, tablets, etc.). For example, an audience measurement entity may generate media exposure metrics based on metadata extracted from the streaming media at the client device and/or similar devices. A report is then generated based on the media exposure to indicate exposure measurements for a type of media (e.g., a genre) using different types of client devices. Thus, for example, reports indicating the popularity of watching, for instance, sports events on certain client devices (e.g., mobile devices, tablets, etc.) can be compared to other popularities of watching sports events on other client devices (e.g., televisions, personal computers, etc.).

Additionally or alternatively, popularities of different types of media across different device types may be compared. Such different types of media may be, for example, news, movies, television programming, on-demand media, Internet-based media, games, streaming games, etc. Such comparisons may be made across any type(s) and/or numbers of devices including, for example, cell phones, smart phones, dedicated portable multimedia playback devices, iPod® devices, tablet computing devices, iPad® devices, standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, etc.) corresponding to the user(s) of the client device (s). Additionally or alternatively, the report may associate the media exposure metrics with metric indicators of popularity of artist, genre, song, title, etc., across one or more user characteristics selected from one or more demographic segment(s), one or more age group(s), one or more gender (s), and/or any other user characteristic(s).

In some examples, the media exposure metrics are used to determine demographic reach of streaming media, ratings for streaming media, engagement indices for streaming media, user affinities associated with streaming media, and/or any other audience measure metric associated with streaming media and/or locally stored media. In some examples, the media exposure metrics are audience share metrics indicative of percentages of audiences for different device types that accessed the same media. For example, a first percentage of an audience may be exposed to news media via smart phones, while a second percentage of the audience may be exposed to the same news media via tablets.

Disclosed example methods include extracting a metadata tag from a first media part, where the metadata tag corresponds to a playback position in a second media part and the first and second media parts are portions of a first item of media. The disclosed example methods further include detecting a third media part that is not part of the first item of media when playback of the first media part is completed and, in response to completion of playback of the first media part or detecting the third media part, storing a first duration of the first media part as an offset value. The disclosed example methods further include detecting the second media part when playback of the third media part is completed and, while the second media part is being played, looking up the metadata tag when the playback position is traversed, traversal of the playback position being identified based on the offset value. The disclosed example methods further include sending the metadata tag to an audience measurement entity based on the looking up of the metadata tag.

Some disclosed example methods further include detecting a fourth media part that is not part of the first item of media when playback of the second media part is completed and, in response to completion of playback of the second media part or detecting the fourth media part, setting the offset value based on the first duration and a second duration of the second media part. These disclosed example methods further include, when playback of the fourth media part is completed, detecting a fifth media part that is a portion of the first item of media, where a second metadata tag corresponds to a second playback position within a third duration of the fifth media par. These disclosed example methods further include looking up the second metadata tag when the second playback position is traversed while the fifth media part is being played, where traversal of the second playback position is identified based on the offset value.

Some disclosed example methods further include storing the metadata tag in a data structure using playback position as a lookup key. In some disclosed examples, the detecting of the third media part includes detecting a media insertion marker. In some such examples, the metadata tag is associated with the audience measurement entity, and the detecting of the third media part further includes determining that the third media part does not have metadata tags associated with the audience measurement entity.

In some disclosed example methods, the sending of the metadata tag to the audience measurement entity is in response to traversal of the playback position. Some disclosed example methods further include sending a request for the first media part to a server via a communications network, and receiving instructions to perform the extracting of the metadata tag, where the detecting of the third media part, the storing of the first duration, the detecting of the second media part, and the looking up of the metadata tag are in a response to the request.

Some disclosed example methods further include looking up a second metadata tag that corresponds to a second playback position in the first media part when the second playback position is traversed while the first media part is being played, where the second playback position is based on the portion of the first media part being played.

Disclosed example apparatus include a media presenter, a metadata retriever, a file detector, a duration setter, and a transmitter. In the disclosed example apparatus, the media presenter presents media. In the disclosed example apparatus, a metadata retriever is to: extract a metadata tag from a first media part, where the metadata tag corresponds to a playback position in a second media part, and the first and second media parts are portions of a first item of media. In the disclosed example apparatus, the metadata retriever also looks up the metadata tag when the playback position is traversed while the second media part is being played, where traversal of the playback position is identified based on an offset value. In the disclosed example apparatus, the file detector is to detect a third media part that is not part of the first item of media when playback of the first media part is completed, and detect the second media part when playback of the third media part is completed. In the disclosed example apparatus the duration setter stores a first duration of the first media part as the offset value in response to completion of playback of the first media part or detecting the third media part. In the disclosed example apparatus, the transmitter sends the metadata tag to an audience measurement entity based on the looking up of the metadata tag.

Some disclosed example apparatus further include a structure generator that stores the extracted metadata tag in a data structure using the playback position as a lookup key, where the metadata retriever look ups the metadata tag in the data structure. In some examples, the file detector determines whether the second media part is part of the first item of media and determines whether third media part is part of the first item of media.

Some disclosed example apparatus further include a metadata converter to convert a uniform resource locator in the metadata tag into a request for the uniform resource locator. In some examples, the metadata retriever is to looks up a second metadata tag that corresponds to a second playback position in the first media part when the second playback position is traversed while the first media part is being played, where the second playback position is based on the portion of the first media part being played.

In some disclosed examples, the file detector detects the third media part by detecting a media insertion marker. In some examples, the metadata tag is associated with the audience measurement entity, and the file detector detects the third media part by determining that the third media part does not have metadata tags associated with the audience measurement entity.

FIG. 1 is a diagram of an example system 100 constructed in accordance with the teachings of this disclosure for measuring exposure to streaming media. The example system 100 of FIG. 1 monitors media provided by an example media provider 110 for presentation on client devices. The example system 100 includes an example service provider 120, an example network 150, an example client device 160, an example media monitor 165, and an example central facility 170 of an audience measurement entity. While the illustrated example of FIG. 1 discloses an example implementation of the service provider 120, other example implementations of the service provider 120 may additionally or alternatively be used, such as the example implementations disclosed in co-pending U.S. patent application Ser. No. 13/341,646, which is hereby incorporated by reference herein in its entirety.

The media provider 110 of the illustrated example of FIG. 1 corresponds to any one or more media provider(s) capable of providing media for presentation at the client device 160. The media provided by the media provider(s) 110 can be any type of media, such as audio, video, multimedia, software, etc. Additionally, the media can correspond to live (e.g., broadcast) media, stored media (e.g., on-demand content), etc.

The service provider 120 of the illustrated example of FIG. 1 provides media services to the client device 160 via, for example, web pages including links (e.g., hyperlinks, embedded media, etc.) to media provided by the media provider 110. In the illustrated example, the service provider 120 modifies the media provided by the media provider 110 prior to transmitting the media to the client device 160. The example service provider 120 obtains media, prepares the media for monitoring at the client device 160, and provides the client device 160 with requested media (which has been prepared for monitoring) with the media monitor 165. In the illustrated example, the service provider 120 includes an example media identifier 125, an example transcoder 130, an example metadata embedder 135, an example marker embedder 136, an example monitor embedder 138, and an example media transmitter 140. In some examples, the service provider 120 and the media provider 110 are implemented in the same entity and/or device.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks, one or more video (e.g., image) watermarks, etc., embedded in the audio and/or video of the media obtained from the media provider 110. (For example, the media may include pulse code modulation (PCM) audio data or other types of audio data, uncompressed video/image data, etc.)

The example media identifier 125 of FIG. 1 determines (e.g., derives, decodes, converts, etc.) the metering data (e.g., such as media identifying information, source identifying information, etc.) included in or identified by a watermark embedded in the media and converts this metering data and/or the watermark itself into a text and/or binary format for inclusion in an ID3 tag and/or other data type (e.g., text, binary, etc.) for transmission as metadata (e.g., such as with a playlist or electronic program guide) accompanying the streaming media. For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, a destination URL that is to be requested by the monitor (e.g., as a dummy request), etc. For example, the ID3 tag may include a URL corresponding to the central facility 170 that the media monitor 165 is to request from the central facility 170 upon receiving the ID3 tag.

The example transcoder 130 of the illustrated example of FIG. 1 is implemented by a logic circuit such as a processor executing instructions, but could additionally or alternatively be implemented by an analog circuit, application-specific integrated circuit (ASIC), a digital signal processor (DSP), a field-programmable gate array (FPGA), and/or other circuitry. In some examples, the transcoder 130 and the media identifier 125 are implemented by the same physical processor. In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with Moving Picture Experts Group (MPEG) 4 audio/video compression for use via the Hypertext Transfer Protocol (HTTP) Live Streaming (HLS) protocol.

In some examples, the transcoder 130 outputs transcoded media into multiple media files that collectively make up the entirety of the received media. The media files for a media item may be transmitted individually in response to requests for respective ones of the media files. For example, a first media file that includes the beginning of the media item is first transmitted to the client device 160, followed by a second media file that includes a second part of the media item that directly follows the part included in the first media file. The media files may have standard, calculated, and/or arbitrary lengths that may be made as equal as practicable or may be different.

The metadata embedder 135 of the illustrated example of FIG. 1 is implemented by a logic circuit such as a processor executing instructions, but could additionally and/or alternatively be implemented by an analog circuit, ASIC, DSP, FPGA, and/or other circuitry. In some examples, the transcoder 130, the media identifier 125, and the metadata embedder 135 are implemented by the same physical processor.

In the illustrated example, the metadata embedder 135 embeds the metadata determined by the media identifier 125 into one or more of the media files (e.g., into respective headers of one or more of the media file(s) designated for metadata) generated by the transcoder 130. For example, the metadata embedder 135 may embed ID3 tags into an ID3 metadata portion of the media file. In some examples, the metadata embedder 135 generates the metadata based on or instead of the identification of the media by the media identifier 125.

In the illustrated example, the metadata embedder 135 embeds the metadata into an internal metadata channel, such as by encoding metadata that is in a binary and/or other appropriate data format into one or more data fields of the transport stream(s) that is(are) capable of carrying metadata. For example, the metadata embedder 135 may insert ID3 tag metadata, which corresponds to the metering metadata, into a portion of the media file designated as an ID3 portion by a specification or convention for the media file type.

In some other examples, the metadata embedder 135 embeds the metadata into the transport stream(s) that is (are) to stream the media in accordance with the HLS or other appropriate streaming protocol. Additionally or alternatively, the metadata embedder 135 may embed the metadata into an external metadata channel, such as by encoding the metadata into an M3U8 (e.g., an M3U formatted file which uses Unicode Transmission Format—8-bit) or other data file that is to be associated with (e.g., included in, appended to, sent prior to, etc.) the transport stream(s) that are to provide the streaming media to the client device 160.

In cases in which playback of the media file is to be interrupted at a selected location (e.g., to play advertisement(s) partway through playback of the media file), the example marker embedder 136 embeds markers in the media. The markers (e.g., ad markers, media insertion markers, etc.) designate the location(s) in the media at which playback is to be interrupted, such as to play advertisements. The example markers may be recognizable metadata that indicate the locations of these interruptions within the playback of the media.

In some examples, the marker embedder 136 splits up the media file into separate media files at the selected location(s) of the interruptions. For example, to insert one advertisement, the marker embedder 136 may split the media file into two media files, which are then provided to the client device 160. The marker embedder 136 may additionally generate and provide a playlist indicating that the two media files are separate but are to be played in succession, but with a third media file intervening between playback of the two media files. When the client device 160 reaches the end of the first of the media files, the example client device 160 requests a next video in the playlist from the service provider 120 or from a third-party media provider.

The example monitor embedder 138 of FIG. 1 embeds instructions to implement the media monitor 165 into a response to a request for the media, such as in a web page. For example, the monitor embedder 138 of FIG. 1 may configure HTML instructions, Javascript instructions, and/or any other code or instructions to be executed by the client device 160 (e.g., in a browser application). The example monitor embedder 138 may configure the instructions based on the media identified by the media identifier 125, a file name convention used by the transcoder 130, and/or the metadata embedded in the video by the metadata embedder 136.

The media transmitter 140 of the illustrated example of FIG. 1 is implemented by a logic circuit such as a processor executing instructions, but could additionally or alternatively be implemented by an analog circuit, ASIC, DSP, FPGA, and/or other circuitry. In some examples, the media identifier 125, the transcoder 130, the metadata embedder 135, the marker embedder 136, the monitor embedder 138, and the media transmitter 140 are implemented by the same physical processor.

The media transmitter 140 employs any appropriate technique(s) to select and/or stream the media to a requesting device, such as the client device 160. For example, the media transmitter 140 of the illustrated example selects media that has been identified by the media identifier 125, transcoded by the transcoder 130 and undergone metadata embedding by the metadata embedder 135. The media transmitter 140 then streams the media to the client device 160 via the network 150 using HLS, or any other streaming protocol(s) and/or non-streaming transfer protocol(s).

In some examples, the media identifier 125, the transcoder 130, the metadata embedder 135, and/or the marker embedder 136 prepare media for streaming regardless of whether (e.g., prior to) a request is received from the client device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the client device 160 when a request is received from the client device 160. In other examples, the media identifier 125, the transcoder 130, and/or the metadata embedder 135 prepare the media for streaming in response to a request received from the client device 160.

The example network 150 of the illustrated example is the Internet. Additionally or alternatively, any other network(s) communicatively linking the service provider 120 and the client device such as, for example, a private network, a local area network (LAN), a virtual private network (VPN), etc. may be used. The network 150 may comprise any number of public and/or private networks using any type(s) of networking protocol(s).

The client device 160 of the illustrated example of FIG. 1 is a computing device that is capable of presenting streaming media provided by the media transmitter 140 via the network 150. The client device 160 may be, for example, a tablet, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc. In the illustrated example, the client device 160 includes a media monitor 165. In some other examples, the media monitor 165 is received with an item of media to be monitored, such as instructions received in a web page that implements a media player. Example Javascript® instructions to implement the media monitor 165 are described below with reference to FIG. 3.

In the illustrated example, the media monitor 165 is implemented using a media player (e.g., a browser, a local application, etc.) that presents streaming media provided by the media transmitter 140. For example, the media monitor 165 may additionally or alternatively be implemented in Adobe® Flash® (e.g., provided in a Shockwave Flash (SWF) file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof. In the illustrated example, the media monitor 165 reports metering data to the central facility 170. While a single client device 160 is illustrated, any number and/or type(s) of media presentation devices may be used.

The central facility 170 of the audience measurement entity of the illustrated example of FIG. 1 includes an interface to receive reported metering information (e.g., metadata) from the media monitor 165 of the client device 160 via the network 150. In the illustrated example, the central facility 170 includes a HTTP interface to receive HTTP requests that include the metering information. Example metering information includes requests (e.g., HTTP requests) that include unique information identifying the media being presented and/or a specific portion of that media. Additionally or alternatively, any other method(s) to receive metering information may be used such as, for example, an HTTP Secure protocol (HTTPS), a file transfer protocol (FTP), a secure file transfer protocol (SFTP), etc. In the illustrated example, the central facility 170 stores and analyzes metering information received from a plurality of different client devices. For example, the central facility 170 may sort and/or group metering information by media provider 110 (e.g., by grouping all metering data associated with a particular media provider 110). Any other processing of metering information may additionally or alternatively be performed.

Figure 2:
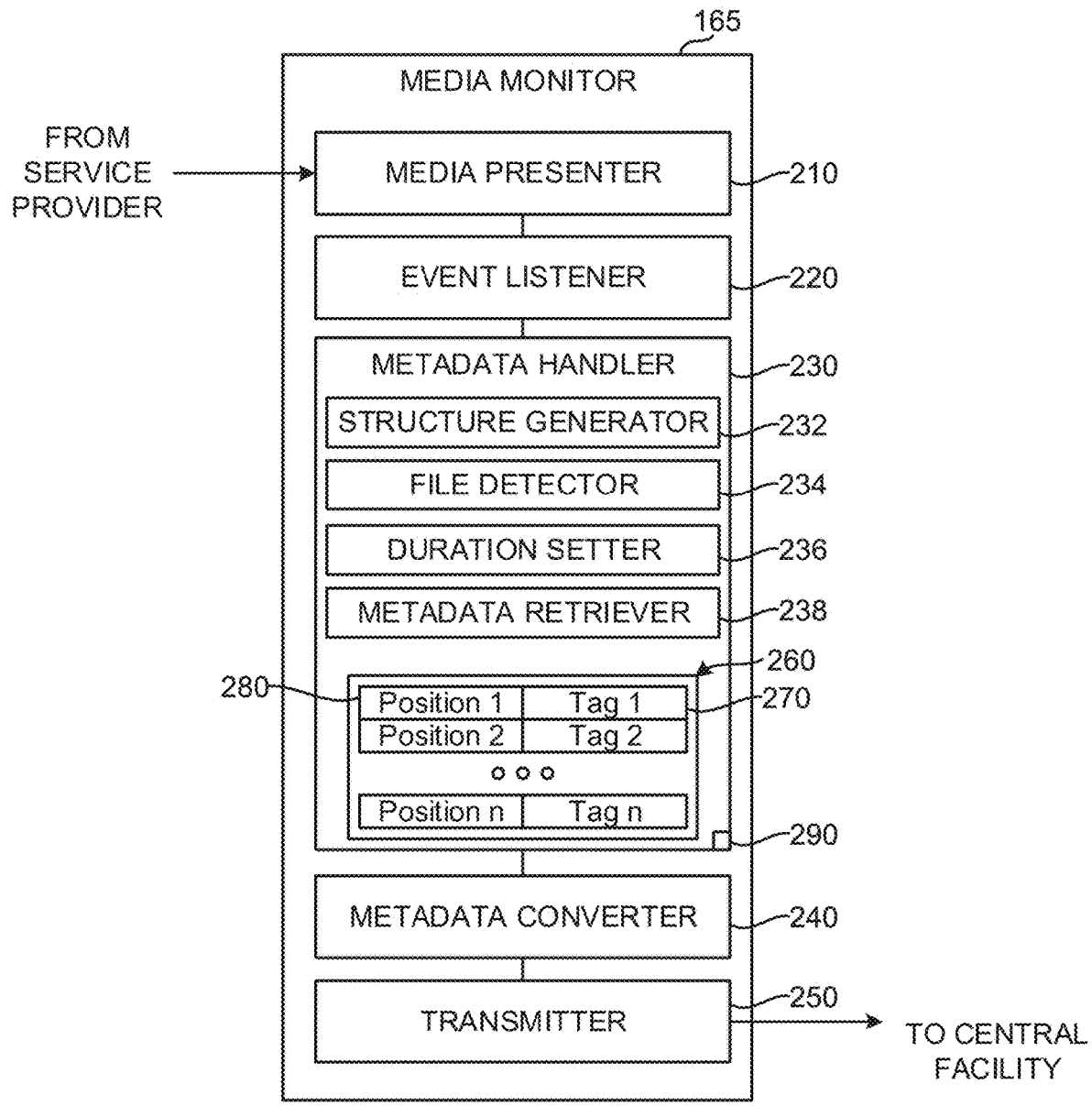
FIG. 2 is a block diagram of an example implementation of the media monitor of FIG. 1.

FIG. 2 is a block diagram of an example implementation of the media monitor 165 of FIG. 1. The media monitor 165 of the illustrated example of FIG. 2 includes an example media presenter 210, an example event listener 220, an example metadata handler 230, an example metadata converter 240, and an example transmitter 250.

The media presenter 210 of the illustrated example of FIG. 2 is implemented by a processor executing instructions, but it could additionally or alternatively be implemented by an analog circuit, an ASIC, DSP, FPGA, and/or other circuitry. In the illustrated example, the media presenter 210 is an HTML5 media player implemented in a browser or other application. In some other examples, the media presenter 210 interacts with a QuickTime® application programming interface (API) to display media via the client device 160. Any other media presenting framework may additionally or alternatively be employed. For example, the example media presenter 210 may interact with an Adobe® Flash® media presentation framework.

The example event listener 220 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media presenter 210 and the event listener 220 are implemented by the same physical processor. In the illustrated example, the event listener 220 interfaces with JavaScript functions to enable reception of and/or listening for an event notification.

Example event notifications include the media presenter 210 reaching designated locations and/or intervals within the media playback. For example, events may be located every X seconds within the media, based on a playback position of the media (e.g., the number of seconds from the beginning of the media). The value of X represents the granularity at which the audience measurement entity wishes to monitor exposure to an item of media. A lower value of X (i.e., tags corresponding to more playback positions in the media) results in more data being transferred to the central facility 170.

While JavaScript is used to listen for event notifications in the illustrated example, any other framework, such as, for example, ActiveX, Microsoft Silverlight, etc., may be used to listen for event notifications.

The metadata handler 230 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media presenter 210, the event listener 220, and the metadata handler 230 are implemented by the same physical processor. The example metadata handler 230 of FIG. 2 includes a structure generator 232, a file detector 234, a duration setter 236, and a metadata retriever 238.

In the illustrated example, the structure generator 232 retrieves metadata from the media presenter 210 upon loading of media. In the example of FIG. 2, the loaded media has a set of metadata "tags" in a metadata portion of a media file. The metadata tags correspond to playback positions in the media. In some examples, a first media file includes metadata tags for the first media files and for one or more subsequent media files. For example, if a media item of interest is split into multiple media files such that supplemental media can be inserted midstream (e.g., an advertisement insertion), the first media file in the sequence may include metadata tags corresponding to playback positions in the first media file and the subsequent media files.

In the example of FIG. 2, the structure generator 232 populates a table 260 or matrix with the metadata tags 270 and the playback positions 280 corresponding to the metadata tags 270. When the media presenter 210 reaches a playback position that corresponds to a metadata tag 270 in the table 260, the example metadata retriever 238 retrieves the metadata tag 270 corresponding to the playback position 280.

In examples in which the table 260 includes metadata tags 270 for subsequent media files in addition to the media file in which the metadata was identified, the file detector 234 and the duration setter 236 maintain a multi-file counter 290 that stores a playback position for subsequent media files. For example, when the media presenter 210 reaches the end of one media file in a sequence of multiple media files (not including any inserted media that is not part of the same media item), the example duration setter 236 stores a sum of the durations of the media files in the sequence that have been played.

For example, if one media file in the sequence has been played, and the media file has a duration of 90 seconds, at the end of playback of the media file, the duration setter 236 determines the total duration to be 90 seconds and stores 90 seconds in the multi-file counter 290. At the beginning of playback of a next media file (e.g., a second media file in the sequence having a duration of 45 seconds), the example file detector 234 determines whether the second media file is a continuation of the previous media file(s) such that the tags from the previous media files are to be used for the second media file. The file detector 234 and/or the media presenter 210 may determine the continuity of sequential media files based on comparing file names (e.g., based on a convention), by querying the provider of the media for the relationship between the files, or by any other means. For example, if the first media file has a file name (e.g., a URL) ending in "/movie_pt1.mp4" and the second media file has the same file name (e.g., a URL) except that the file name ends in "/movie_pt2.mp4," the example file detector 234 may determine that the metadata tags from the first media file are to be used for monitoring the second media file because the URLs or names of the media files are merely incremented.

While the second media file is being played by the media presenter 210, metadata tags are extracted by adding the playback position within the second media file (e.g., measured from the beginning of the second media file) to a value of the multi-file counter 290 (e.g., 90 seconds). For example, the playback position of 20 seconds in the second media file playback is determined to correspond to a metadata tag for 110 seconds (e.g., 90 second counter value+20 second playback position), which also corresponds to the 110 second playback position in the media item. After finishing playback of the second media file, the duration setter 236 adds the 45 second duration of the second media file to the multi-file counter 290, and stores the total value of 135 seconds stored in the multi-file counter 290.

When the example event listener 220 of FIG. 2 detects an event (e.g., when the playback position of the media presenter 210 is equal to one of the positions 280 in the table 260), the example metadata retriever 238 retrieves the corresponding metadata tag 270 from the table 260 by looking up the playback position 280 in the table 260. While JavaScript is used to retrieve the metadata tag 270 in the illustrated example, any other framework, such as, for example, ActiveX, Microsoft Silverlight, etc., may be used to retrieve the metadata tag 270.

The metadata converter 240 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media presenter 210, the event listener 220, the metadata handler 230, and the metadata converter 240 are implemented by the same physical processor. In the illustrated example, the metadata converter 240 converts the metadata tag 270 retrieved by the metadata retriever 238 into a format for transmission to the central facility 170. For example, the metadata converter 240 may encrypt, decrypt, compress, modify, etc., the metadata tag 270 and/or portions of the metadata tag 270 to, for example, reduce the amount of data to be transmitted to the central facility 170. In some examples, the metadata tags 270 represent respective URLs (e.g., unique URLs). In such examples, the metadata converter 240 converts the URL in the metadata tag 270 to an HTTP request for transmission to the central facility 170 of FIG. 1.

The transmitter 250 of the illustrated example of FIG. 2 is implemented by a logic circuit such as a processor executing instructions, but it could additionally or alternatively be implemented by an analog circuit, an ASIC, DSP, FPGA, and/or other circuitry. In some examples, the media presenter 210, the event listener 220, the metadata handler 230, the structure generator 232, the file detector 234, the duration setter 236, the metadata retriever 238, the metadata converter 240, and the transmitter 250 are implemented by the same physical processor. In the illustrated example, the transmitter 250 transmits a media monitoring message including the converted metadata tag 270 (e.g., an HTTP request including a URL defined in the metadata tag 270) to the central facility 170 via, for example, the Internet. In some examples, the metadata is transmitted in substantially real-time. In some other examples, the metadata is stored, cached, and/or buffered before being transmitted to the central facility 170. The metadata is transmitted to the central facility 170 in the illustrated example. In some other examples, the metadata is transmitted to a different destination such as, for example, a display element of the media monitor 165 and/or the client device 160. Additionally or alternatively, the transmitter 250 may transmit an identifier of the media monitor 165 and/or the client device 160 to enable the central facility 170 to correlate the metadata with a panelist, a group of panelists, a demographic, etc. In the illustrated example the central facility 170 is associated with an audience measurement company and is not involved with the delivery of media to the client device.

FIG. 3 illustrates example Hypertext Markup Language (HTML) instructions 300 representing a webpage that may be displayed by the media monitor 165 of FIG. 2 when included in the client device 160 of FIG. 1. The example instructions 300 of FIG. 3 may be provided in a web page that includes and/or loads media to be monitored by the media monitor 165.

The example instructions 300 include event configuration instructions 305, media presentation instructions 310, metadata structure instructions 315, and presentation monitoring instructions 320. The example presentation monitoring instructions 320 includes file detection instructions 330, file handling instructions 335, a metadata retrieval instruction 340, and a metadata conversion/transmission instruction 345.

The example configuration instructions 305 may be executed by the example file detector 234 of FIG. 2 to configure the event listener 220 to detect an end of a media file. For example, when the media presenter 210 finishes playback of a media file, an "end" event occurs that is detected by the example event listener 220, which may be provided to the file detector 234 (e.g., as an interrupt or exception).

The example media presentation instructions 310 may be executed by the example media presenter 210 of FIG. 2 to load and play media files. The example media presentation instructions 310 are executed when the web page is initially loaded at the media monitor 165.

The example metadata structure instructions 315 may be executed by the example structure generator 232 of FIG. 2 to identify the location(s) of metadata tags within the media file, select or extract the metadata that includes the metadata tags, split the metadata into individual metadata tags by identifying a divider character (e.g., a space, a breaking space, or any other selected data element), and placing the metadata tags split from the metadata into a data structure (e.g., an array, the table 260 of FIG. 2, etc.). In the example metadata structure instructions 315, the metadata tags are placed into the structure with an assumed or predetermined playback interval between the metadata tags. For example, the first metadata tag may correspond to a beginning of the media, and each subsequent metadata tag corresponds to a selected interval that follows the immediately prior metadata tag (e.g., tag 2 is X seconds of playback position after tag 1, etc.).

The example presentation monitoring instructions 320 may be executed by the example event listener 220, the example file detector 234, the example duration setter 236, and the example metadata retriever 238. The presentation monitoring instructions 320 are performed during playback of media by the media presenter 210 (e.g., repeatedly at intervals of X seconds), and include event monitoring instructions 325, file detection instructions 330, file handling instructions 335, metadata retrieval instruction 340, and metadata conversion/transmission instruction 345.

The example event monitoring instructions 325 may be executed by the example event listener 220 of FIG. 2 to monitor a playback status of the media presenter 210. For example, the event listener 220 determines a current playback position and a total playback position of the media file being played by the media presenter 210. The example event monitoring instructions 325 are executed at specified interval(s) to repeatedly determine the playback status.

The example file detection instructions 330 may be executed by the example file detector 234 to determine a current media file (e.g., URL of the media file, file name of the media file, etc.). The example file detection instructions 330 of FIG. 3 detect whether a media file is associated with primary media (e.g., is not secondary media, such as an advertisement, inserted midstream into primary media) or is not associated with primary media. For example, the file detection instructions 330 of FIG. 3 determine whether a file name of the media includes a designated string.

The example file detection instructions 330 are specified by the monitor embedder 138 of FIG. 1 based on the media being provided to the client device 160. In the illustrated example, the designated string is "examplevideo_" and the media file name convention follows a pattern in which the portion following the designated string is a number that is incremented for each subsequent media file that is part of the media item. For example, if the first media file is "examplevideo_0.m4v," the second media file may be "examplevideo_1.m4v," the third media file may be "examplevideo_2.m4v," and so on for subsequent media files for the media item. In contrast, inserted media does not follow the media file name convention. Thus, the example file detection instructions 330 include instructions to determine file names that follow a media file name convention and file names that do not follow the media file name convention. However, the file detection instructions 330 may use any other method to distinguish between files containing primary media (e.g., media of interest) and secondary media.

The example file handling instructions 335 may be executed by the example duration setter 236 of FIG. 2 to handle a subsequent file based on whether the subsequent file corresponds to the primary media of interest or, instead, is secondary media such as an advertisement that is being inserted midstream. In the example of FIG. 3, when a media file that has finished playback is a media file of a primary media item (e.g., as determined by the file detection instructions 330), the example file handling instructions 335 include adding a duration of the media item to a total duration count (e.g., the duration_0 variable of FIG. 3). The total duration count enables the metadata retriever 238 to determine a playback position within the overall media item that is divided up into multiple media files (e.g., measured from the beginning of the media item). For example, if a third media file in the media item follows a first media file having a duration of 20 seconds and a second media file having a duration of 30 seconds (regardless of intervening secondary media that is not part of the same media item as the first, second, and third media files), the total duration used during playback of the third media file is 50 seconds. The total duration is used by the metadata retriever 238 to determine the appropriate metadata to be retrieved.

Additionally, when a media file is determined to be part of the media item, the example file handling instructions 335 add the total duration count to a current playback position determined by the media presenter 210.

The example metadata retrieval instruction 340 may be executed by the metadata retriever 238 of FIG. 2 to determine a playback position within the media, based on the playback position within the current media file (e.g., the "tiem" variable) being played by the media presenter 210 and the total of the duration(s) of any previous media file(s) played by the media presenter 210 that correspond to the same media item (e.g., the "duration_0" variable).

The example metadata conversion/transmission instruction 345 may be executed by the metadata retriever 238 and/or the metadata converter 240 of FIG. 2 to convert and/or transmit metadata. The example metadata conversion/transmission instruction 345 is a compound instruction that both accesses the metadata tag and outputs the accessed metadata tag. An example output may be an HTTP request that includes a request for a URL specified in the metadata tag.

FIG. 4 illustrates example metadata 400 included in a media file presented that may be monitored by the media monitor 165 of FIG. 1. The example metadata 400 includes multiple metadata tags 405-430. The example metadata 400 of FIG. 4 is shown in a string format in which it may be found in a metadata portion (e.g., a header portion) of a media file. Alternating ones of the metadata tags 405-430 are shown in boldface to illustrate where one tag ends and the subsequent tag begins.

The example structure generator 232 of FIG. 2 executes the example metadata structure instructions 315 of FIG. 3 to insert the example metadata tags 405-430 into a data structure, such as the table 260 of FIG. 2. In the example of FIG. 4, the structure generator 232 may store the metadata tag 405 as corresponding to a first time in the media (e.g., the beginning of the media), store the metadata tag 410 as corresponding to a second time in the media (e.g., 2 seconds from the beginning of the media), store the metadata tag 415 as corresponding to a third time in the media (e.g., 4 seconds from the beginning of the media), and so on for the metadata tags 420-430 at similar intervals.

Each of the example metadata tags 405-430 of FIG. 4 includes a unique URL. When one of the metadata tags 405-430 is retrieved by the metadata retriever 238 (e.g., in response to the media presenter 210 reaching the media position corresponding to the metadata tag 405-430), the example metadata converter 240 converts the retrieved metadata tag 405-430 to an HTTP request for the URL specified in the retrieved metadata tag 405-430. Upon receiving the HTTP request, the example central facility logs an exposure to the corresponding 2 second portion of the media file.

Figure 5:
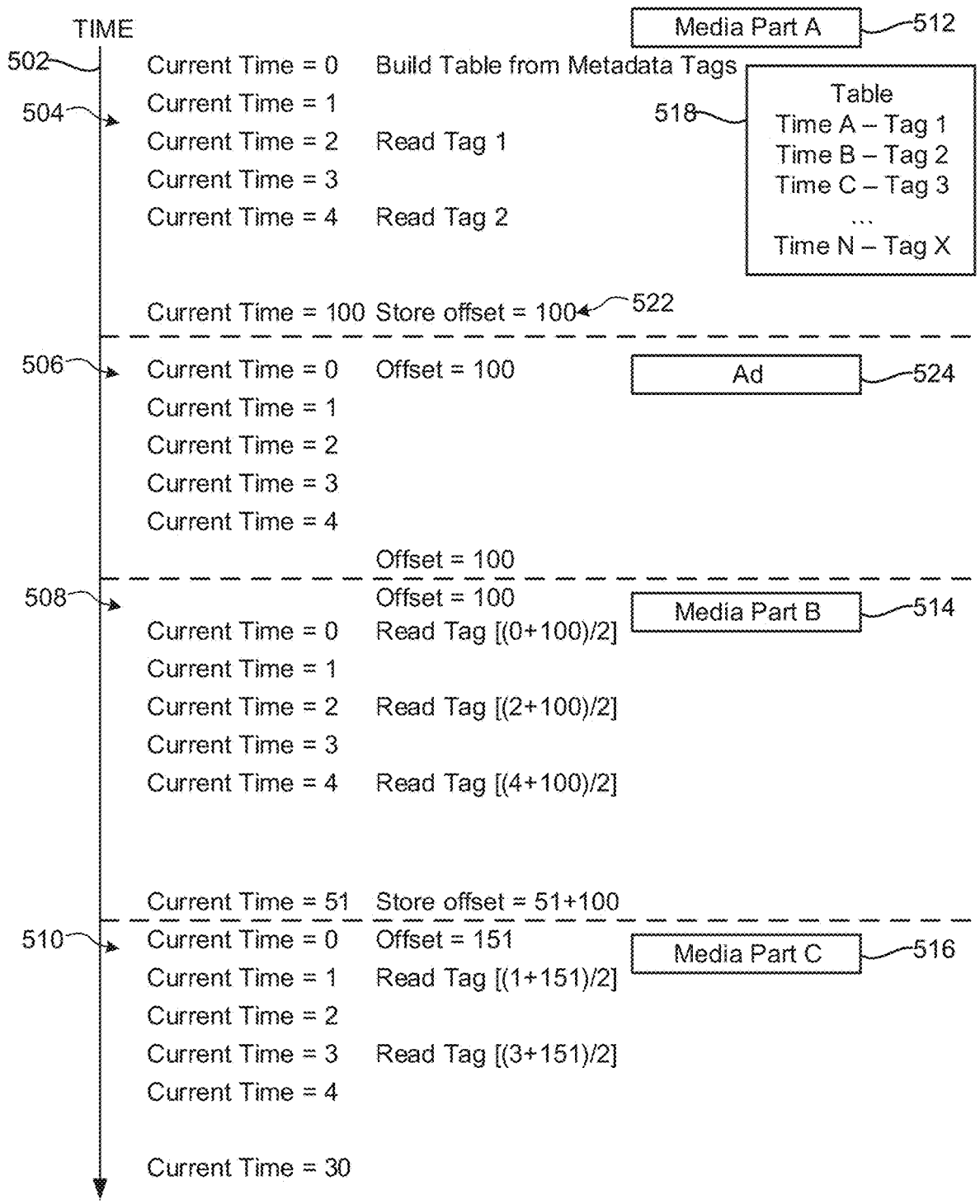
FIG. 5 illustrates an example of monitoring a media presentation including dynamically inserted media.

FIG. 5 illustrates an example of monitoring a media presentation including dynamically inserted media. The example of FIG. 5 may be performed by the example media monitor 165 of FIGS. 1 and/or 2. The example operation of the media monitor 165 is shown along a timeline 502, and is divided into four example time periods 504, 506, 508, 510 for ease of discussion.

The example media in the example of FIG. 5 includes three parts: media part A 512, media part B 514, and media part C 516. During the first time period 504, the example media presenter 210 loads media part A 512. When the media part A 512 is loaded, the example structure generator 232 of FIG. 2 determines that there are metadata tags in the media file and builds a table 518 (e.g., the table 260 of FIG. 2) including the metadata tags.

The example media presenter 210 begins playing the media part A 512. During playback, the event listener 220 monitors the status of the media presenter 210 (e.g., the playback position, the media source). At Current Time=2 (e.g., the playback position of the media presenter 210 is at 2 seconds), the example metadata handler 230 (e.g., via the metadata retriever 238) identifies that an event output by the event listener 220 is a playback position that corresponds to a metadata tag (e.g., Tag 1) in the table 518. The metadata retriever 238 reads Tag 1 (e.g., a first URL) from the table 518, the metadata converter 240 converts Tag 1 to an HTTP request containing the data stored in Tag 1 (e.g., the first URL), and the transmitter 250 transmits the request (e.g., to the central facility 170 of FIG. 1).

Similarly, at Current Time=4 (e.g., the playback position of the media presenter 210 is at 4 seconds), the example metadata handler 230 (e.g., via the metadata retriever 238) identifies that an event output by the event listener 220 is a playback position that corresponds to a metadata tag (e.g., Tag 2) in the table 518. The metadata retriever 238 reads Tag 2 (e.g., a second URL) from the table 518, the metadata converter 240 converts Tag 2 to an HTTP request containing the data stored in Tag 2 (e.g., the second URL), and the transmitter 250 transmits the request (e.g., to the central facility 170 of FIG. 1).

At Current Time=100, the example file detector 234 determines that an end of the media file has been reached based on the event listener 220 listening for an end of a media file being reached by the media presenter 210. In some other examples, the file detector 234 identifies that a marker has been reached by the media presenter 210 based on an output by the media presenter 210. Based on determining that the end of the media file has been reached, and that the media file is part of the media item being monitored (e.g., based on a file name convention), the example duration setter 236 stores the duration of the media part A 512 as an offset variable 522.

During the example second time period 506 of FIG. 5, an advertisement 524 is loaded and presented as a mid-stream presentation. However, any other type of media may be presented mid-stream, instead of an advertisement. The example file detector 234 determines that the subsequent file being loaded by the media presenter 210 is not related to the media part A 512 (e.g., based on having a different file name or any other method of detection). During the second time period 506, the metadata handler 230 does not extract metadata or provide metadata to the central facility 170.

At an end of the second time period 506, the example file detector 234 determines that an end of the media file has been reached based on the event listener 220 listening for an end of a media file being reached by the media presenter 210. Based on determining that the end of the media file has been reached, and that the media file is not part of the media item being monitored (e.g., based on the media file for the advertisement 524 not conforming to the file name convention), the example duration setter 236 does not add the duration of the advertisement 524 to the total stored offset.

During the example third time period 508, the example file detector 234 determines that the media being presented (e.g., media part B 514) is part of the same media item as the media part A 512 in the first time period 504 (e.g., based on the media part A 512 and the media part B 514 following a same file name convention).

The example media presenter 210 begins playing the media part B 514. During playback, the event listener 220 monitors the status of the media presenter 210 (e.g., the playback position, the media source). At Current Time=0 (e.g., the playback position of the media presenter 210 is at 0 seconds), the example metadata handler 230 (e.g., via the metadata retriever 238) identifies that an event output by the event listener 220 is a playback position that corresponds to a metadata tag (e.g., Tag (0+100)/2=Tag 50) in the table 518. The metadata retriever 238 reads Tag 50 (e.g., a URL) from the table 518, the metadata converter 240 converts Tag 50 to an HTTP request containing the data stored in Tag 50 (e.g., the URL), and the transmitter 250 transmits the request (e.g., to the central facility 170 of FIG. 1). The example metadata retriever 238 continues to add the offset of 100 to the Current Time to determine the corresponding one of the metadata tags in the table 518 during the third time period 508.

At the end of the third time period 508, the example file detector 234 determines that an end of the media part B 514 has been reached based on the event listener 220 listening for an end of a media file being reached by the media presenter 210. Based on determining that the end of the media file has been reached, and that the media file is part of the media item being monitored (e.g., based on the file name convention), the example duration setter 236 adds the duration of the media part B 514 to the offset variable 522 and stores the total as the offset variable 522. As a result, the offset variable at the beginning of the fourth time period 510 is the sum of the durations of the media part A 512 (e.g., 100 seconds) and the media part B 514 (e.g., 51 seconds).

As in the example third time period 508, during the fourth time period 510, the metadata retriever 238 adds the stored offset 522 (e.g., 151 seconds) to the playback position obtained from the media presenter 210 to determine whether the playback position corresponds to a metadata tag.

While example manners of implementing the service provider 120 and/or the media monitor 165 of FIG. 1 are illustrated in FIGS. 1 and 2, one or more of the elements, processes and/or devices illustrated in FIGS. 1 and 2 may be combined, divided, re-arranged, omitted, eliminated and/or implemented in any other way. Further, the example media identifier 125, the example transcoder 130, the example metadata embedder 135, the example marker embedder 136, the example monitor embedder 138, the example media transmitter 140, the example media presenter 210, the example event listener 220, the example metadata handler 230, the example structure generator 232, the example file detector 234, the example duration setter 236, the example metadata retriever 238, the example metadata converter 240, the example transmitter 250 and/or, more generally, the example service provider 120 and/or the example media monitor 165 of FIGS. 1 and/or 2 may be implemented by hardware, software, firmware and/or any combination of hardware, software and/or firmware. Thus, for example, any of the example media identifier 125, the example transcoder 130, the example metadata embedder 135, the example marker embedder 136, the example monitor embedder 138, the example media transmitter 140, the example media presenter 210, the example event listener 220, the example metadata handler 230, the example structure generator 232, the example file detector 234, the example duration setter 236, the example metadata retriever 238, the example metadata converter 240, the example transmitter 250 and/or, more generally, the example service provider 120 and/or the example media monitor 165 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 125, the example transcoder 130, the example metadata embedder 135, the example marker embedder 136, the example monitor embedder 138, the example media transmitter 140, the example media presenter 210, the example event listener 220, the example metadata handler 230, the example structure generator 232, the example file detector 234, the example duration setter 236, the example metadata retriever 238, the example metadata converter 240, and/or the example transmitter 250 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example service provider 120 and/or the example media monitor 165 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 6:
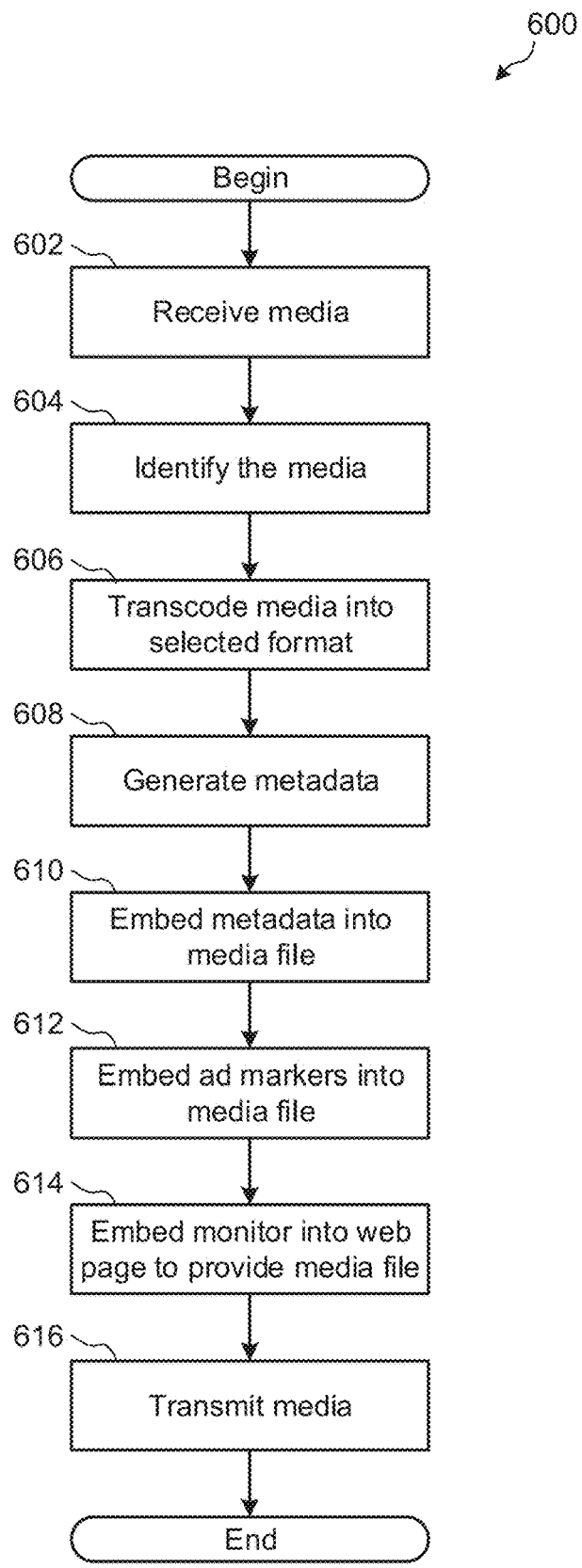
FIG. 6 is a flowchart representative of example machine-readable instructions which may be executed to implement the example service provider of FIG. 1.

A flowchart representative of example machine readable instructions for implementing the service provider 120 of FIG. 1 is shown in FIG. 6. In this example, the machine readable instructions comprise program(s) for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program(s) are described with reference to the flowchart illustrated in FIG. 6, many other methods of implementing the example service provider 120 may alternatively be used. For example, the order of execution of the blocks may be changed, and/or some of the blocks described may be changed, eliminated, or combined.

Figure 7A:
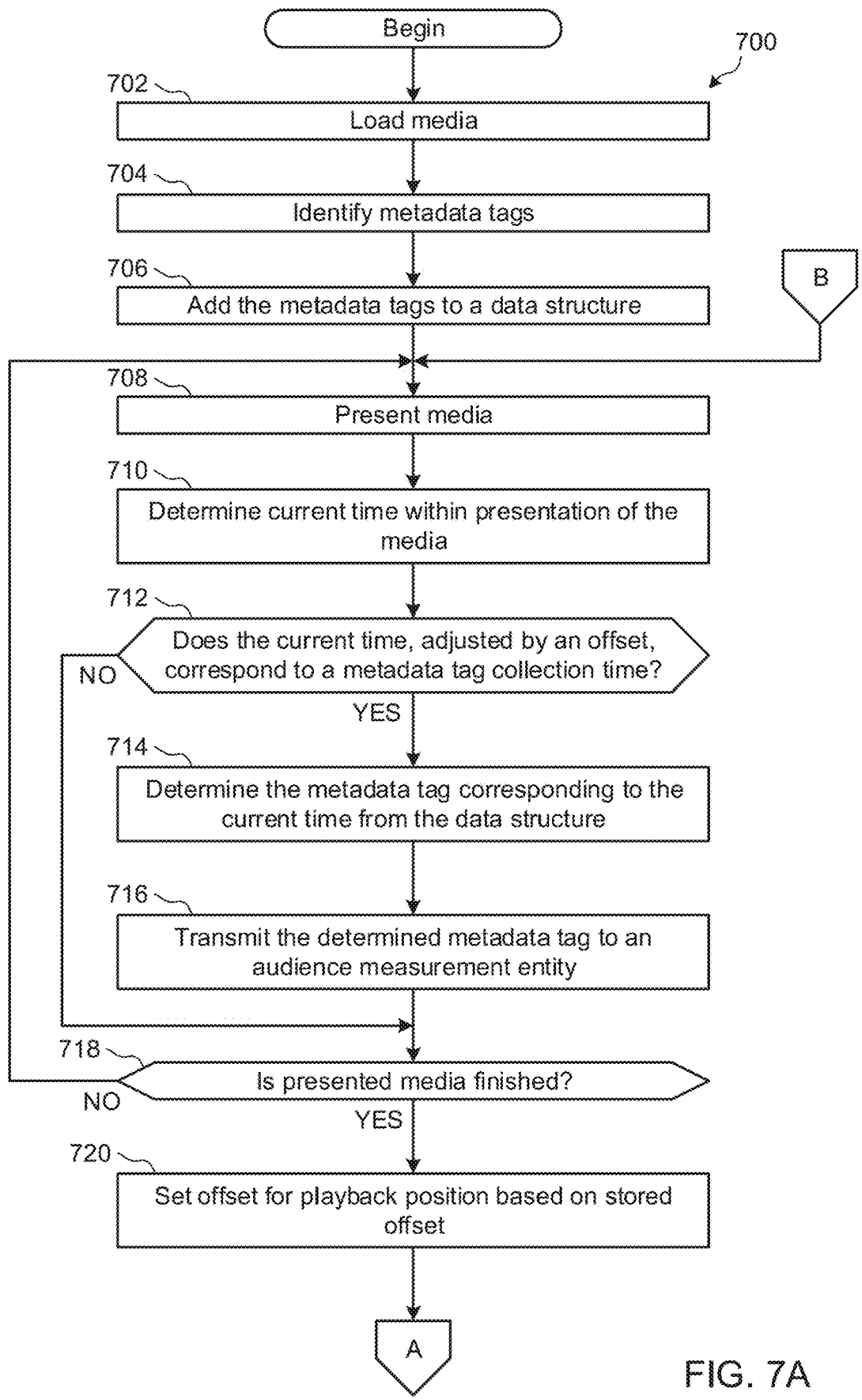
FIGS. 7A and 7B show a flowchart representative of example machine-readable instructions which may be executed to implement the example media monitor of FIGS. 1 and/or 2.
Figure 7B:
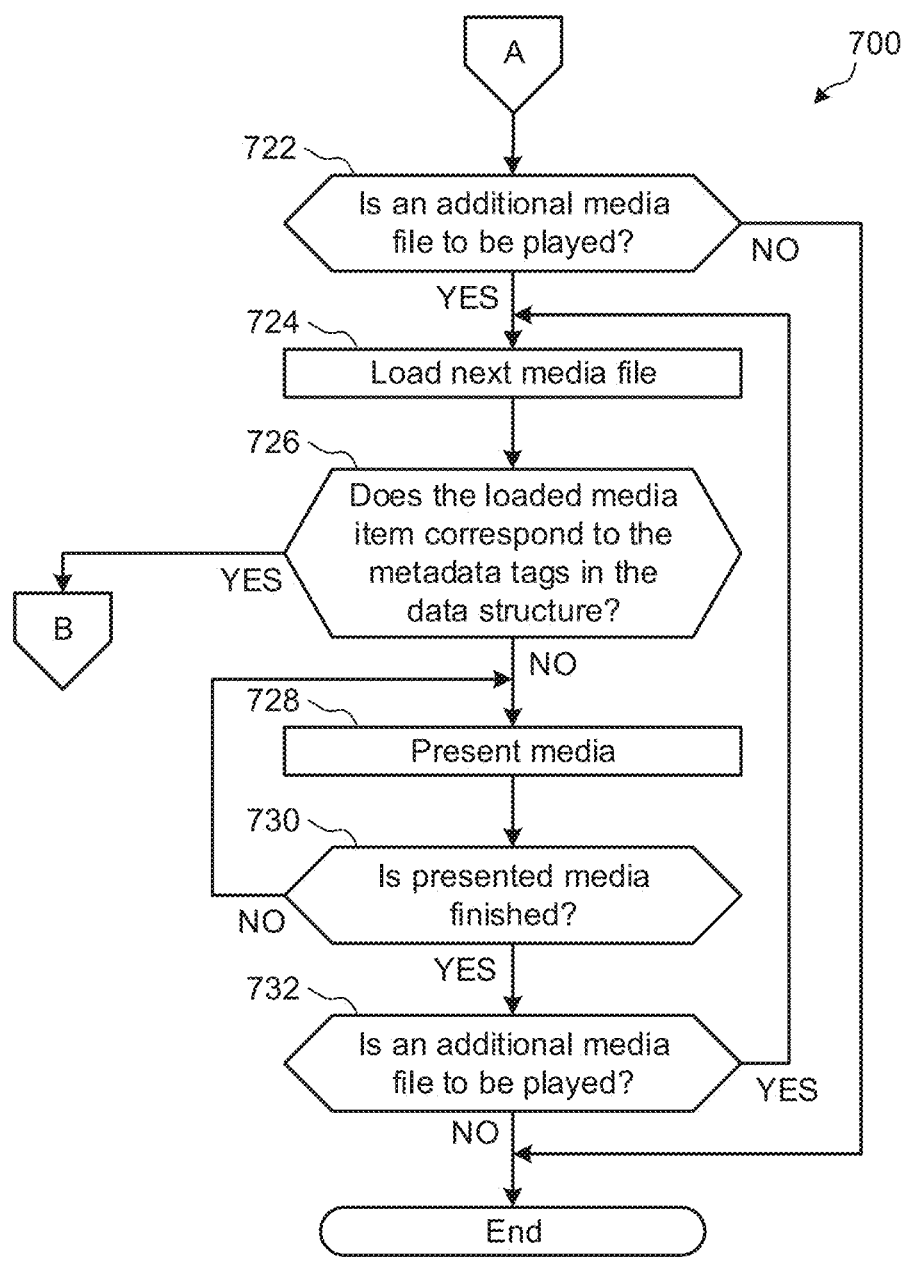

A flowchart representative of example machine readable instructions for implementing the media monitor 165 of FIGS. 1 and 2 is shown in FIGS. 7A and 7B. In this example, the machine readable instructions comprise program(s) for execution by a processor such as the processor 912 shown in the example processor platform 900 discussed below in connection with FIG. 9. The program(s) may be embodied in software stored on a tangible computer readable storage medium such as a CD-ROM, a floppy disk, a hard drive, a digital versatile disk (DVD), a Blu-ray disk, or a memory associated with the processor 912, but the entire program(s) and/or parts thereof could alternatively be executed by a device other than the processor 912 and/or embodied in firmware or dedicated hardware. Further, although the example program(s) are described with reference to the flowchart illustrated in FIG. 6, many other methods of implementing the example media monitor 165 may alternatively be used. For example, the order of execution of the blocks may be changed, and/or some of the blocks described may be changed, eliminated, or combined.

As mentioned above, the example processes of FIGS. 6 and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. As used in the claims of this patent, the term "a" is expressly defined to mean "one or more."

Further, for ease of discussion, operations disclosed herein may be discussed in the context of execution by "a processor." In keeping with the meaning of "a" as "one or more", it is to be understood that such operations can be executed by any number (i.e., one or more) of processors. This is in keeping with the reality, well known to persons of ordinary skill in the art, that operations can be performed by one processor or by multiple processors while still meeting the end purpose of the underlying operations. For example, operations can be assigned to one processor or split among two or more processors in a same integrated circuit package (e.g., co-processors, multi-core processors, etc.) or in separate integrated circuit packages without departing from the scope or spirit of this disclosure. Moreover, processors in separate integrated circuit packages may be on a shared circuit board, on separate circuit boards, in one device, or in two or more devices. For example, in a cloud computing context separate processors remote from, and potentially unknown to, the end user may be assigned to execute operations. Therefore, unless otherwise specified, all references in this specification or the claims of this patent to "a processor" are expressly defined to include any number (i.e., one or more) of processors such that any recited operations can be assigned in any combination to the same or different processors. In short, the assignment of operations to one processor or to two or more processors is immaterial to this disclosure and the claims of this patent.

FIG. 6 is a flowchart representative of example machine-readable instructions 600 which may be executed to implement the example service provider 120 of FIG. 1 to provide media including metadata.

The example media identifier 125 receives media (e.g., from the media provider 110 of FIG. 1) (block 602). The example media identifier 125 identifies the media (block 604). The example media may include watermarks that can be extracted and decoded to identify the media.

The example transcoder 130 transcodes media into a selected format (block 606). For example, the transcoder 130 may transcode and/or otherwise process the received media for streaming or other form of transmission (e.g., a streaming or non-streaming format).

The example metadata embedder 135 generates metadata (block 608). The example metadata embedder 135 embeds the metadata into media file (block 610). For example, the metadata embedder 135 may generate unique metadata tags (e.g., ID3 tags) that are identifiable by the central facility 170. The metadata may be generated based on the identity of the media and/or in cooperation with the service provider 120. The example metadata embedder 135 embeds the metadata tags into a metadata portion of the media file.

The marker embedder 136 embeds ad markers into the media file (block 612). For example, the marker embedder 136 may embed markers into the media file that indicate where a media player is to insert advertisements mid-stream.

The example monitor embedder 138 embeds a monitor (e.g., the media monitor 165) into a web page that is used to provide the media file to the client device 160 (block 614). For example, the monitor embedder 138 may include instructions to implement the media monitor 165, such as the instructions 300 of FIG. 3. The monitor embedder 138 may customize the embedded monitor based on, for example, a file name convention of the media files so that the monitor, when executed by the client device 160, can distinguish primary media from secondary media.

The example media transmitter 140 transmits the media (e.g., including the embedded metadata) (block 616). For example, the media transmitter 140 transmits a web page including the media, the monitor, the ad markers, and the metadata. The example instructions 600 may then end.

FIGS. 7A and 7B show a flowchart representative of example machine-readable instructions 700 which may be executed to implement the example media monitor 165 of FIGS. 1 and/or 2.

The example media presenter 210 loads media (e.g., from the service provider 120 via the network 150) (block 702). For example, the media presenter 210 may load the media as part of a web page, in response to a user request for the media via an interface of the client device 160. In the example of FIGS. 7A and 7B, the web page includes the media and a monitor, and the media includes metadata tags and/or ad markers.

The example structure generator 232 identifies metadata tags in the media (block 704). The structure generator 232 adds the identified metadata tags to a data structure (block 706). For example, the structure generator 232 may add the metadata tags 270 to the table 260 of FIG. 2. The example instructions 315 of FIG. 3 may be executed by the structure generator 232 to implement blocks 704 and 706. In some examples, the metadata tags that are identified and stored correspond to media files in addition to the media file in which the metadata tags were identified.

The example media presenter 210 presents the media (block 708). For example, the media presenter 210 may initiate playback of media such as audio and/or video. During presentation of the media, the example event listener 220 determines a current time (e.g., playback position) within the presentation of the media (block 710). For example, the event listener 220 may determine a current playback position in the media relative to a beginning of a media file currently being played by the media presenter 210.

The example metadata retriever 238 determines whether the current time (e.g., the playback position), when adjusted by an offset, corresponds to a metadata tag collection time (block 712). For example, the metadata retriever 238 may determine whether the sum of the current playback position and a value stored in the multi-file counter 290 in FIG. 2 is equal to one of the playback positions 280 in the table 260.

When the current time (e.g., the playback position), when adjusted by an offset, corresponds to a metadata tag collection time (block 712), the example metadata retriever 238 determines one of the metadata tags that corresponds to the current time from the data structure (block 714). For example, the metadata retriever 238 may determine one of the metadata tags 270 in the table 260 that corresponds to a playback position. The example transmitter 250 of FIG. 2 transmits the metadata tag to an audience measurement entity (block 716). For example, the transmitter 250 may transmit the determined metadata tag to the central facility 170 of FIG. 1 via the network 150, either when the metadata tag 270 is obtained from the table 260 or when multiple metadata tags 270 have been obtained from the table for multiple playback positions (e.g., in a bulk transfer). In some examples, the metadata converter 240 converts the metadata tags to another format suitable for transmission. For example, the metadata converter 240 may convert metadata tags that contain URLs to HTTP requests for transmission by the transmitter 250.

After transmitting the determined metadata tag (block 716), or if the current time (e.g., the playback position), when adjusted by an offset, does not correspond to a metadata tag collection time (block 712), the example event listener 220 determines whether the presented media has finished (block 718). For example, the event listener 220 may identify an event, interrupt, or exception that occurs when the media presenter 210 reaches the end of the current media file. If media presentation is not finished (block 718), control returns to block 708 to continue presenting the media.

When the presented media is finished (block 718), the example metadata retriever 238 sets the offset for determining the playback position (e.g., the value of the multi-file counter 290) based on the stored offset (e.g., a current value of the multi-file counter 290) (block 720). To set the offset, the example metadata retriever 238 adds the duration of the media file that was completed to the stored offset value, and stores the sum as a new offset value.

Turning to FIG. 7B, the example file detector 234 of FIG. 2 determines whether additional media is to be played (block 722). For example, the media presenter 210 may load and play a next file in a playlist when the previous media file is completed. When another file is played, the example media presenter 210 notifies the file detector 234.

When an additional media file is to be played (block 722), the example media presenter 210 loads the next media file (block 724). The file detector 234 determines whether the loaded media item corresponds to the metadata tags in the data structure (block 726). For example, the file detector 234 may determine whether the file name of the subsequent file complies with a file naming convention for the media item. When the loaded media item corresponds to the metadata tags in the data structure (block 726), control returns to block 708 to present the media.

When the loaded media item does not correspond to the metadata tags in the data structure (e.g., the loaded media item is secondary media, such as an advertisement) (block 726), the example media presenter 210 presents the media (block 728). The event listener 220 determines whether the media being presented is finished (block 730). If the media is not finished (block 730), control returns to block 728 to continue presenting the media.

When the media is finished being presented (block 730), the example file detector 234 of FIG. 2 determines whether additional media is to be played (block 732). If an additional media file is to be played (block 732), control returns to block 724 to load the next media file.

When there are no additional media files to be played (block 732 or block 722), the example instructions 700 of FIG. 7B end. The example instructions 700 may be executed again for a subsequent media request by the client device 160.

Figure 8:
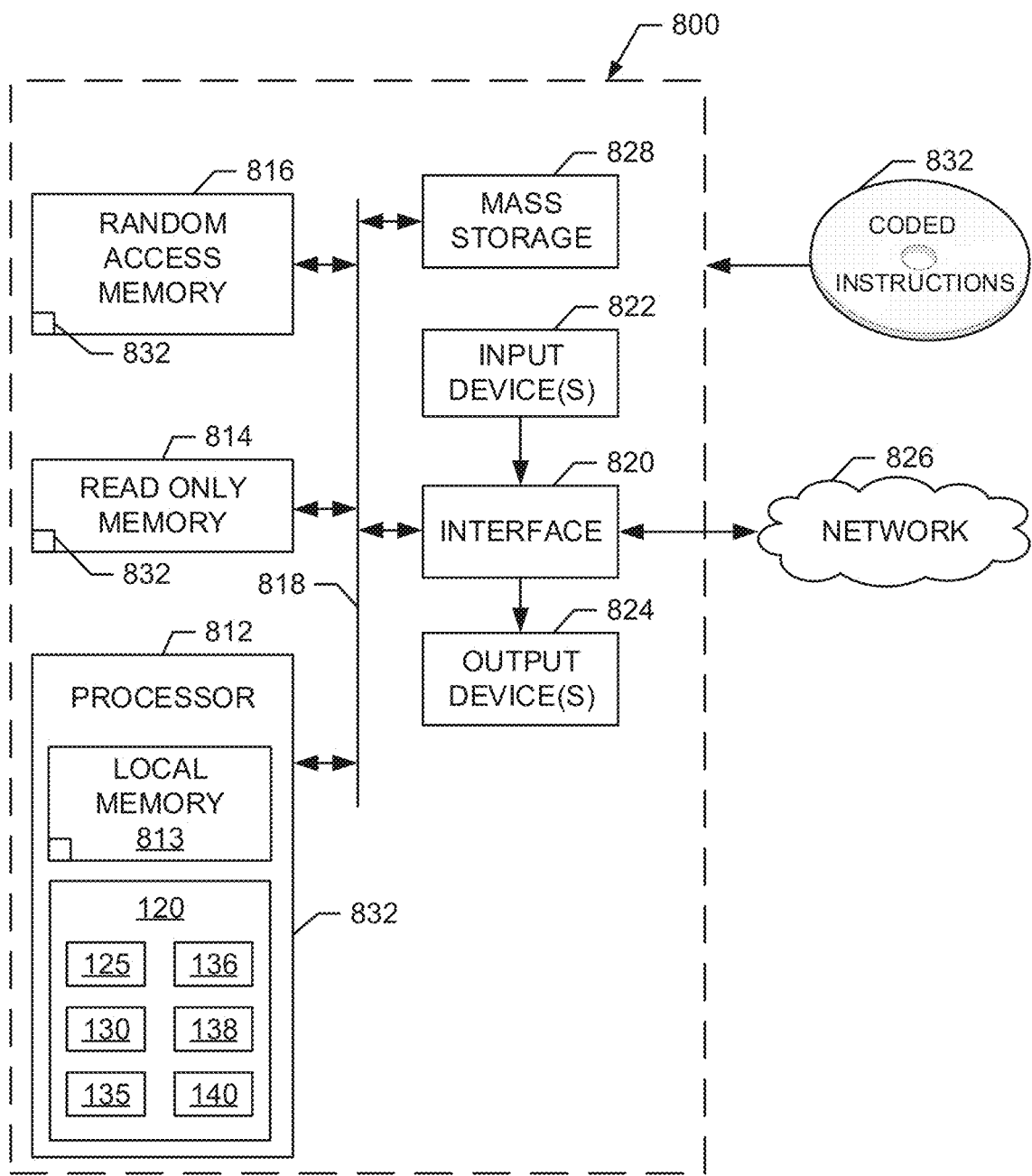
FIG. 8 is a block diagram of an example processor platform capable of executing the instructions of FIG. 6 to implement the service provider 120 of FIG. 1.

FIG. 8 is a block diagram of an example processor platform 800 capable of executing the instructions of FIG. 6 to implement the service provider 120, the example media identifier 125, the example transcoder 130, the example metadata embedder 135, the example marker embedder 136, the example monitor embedder 138, and/or the example media transmitter 140 of FIG. 1. The processor platform 800 can be, for example, a server, a personal computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 6 may be stored in the mass storage device 828, in the volatile memory 814, in the non-volatile memory 816, and/or on a removable tangible computer readable storage medium such as a CD or DVD.

Figure 9:
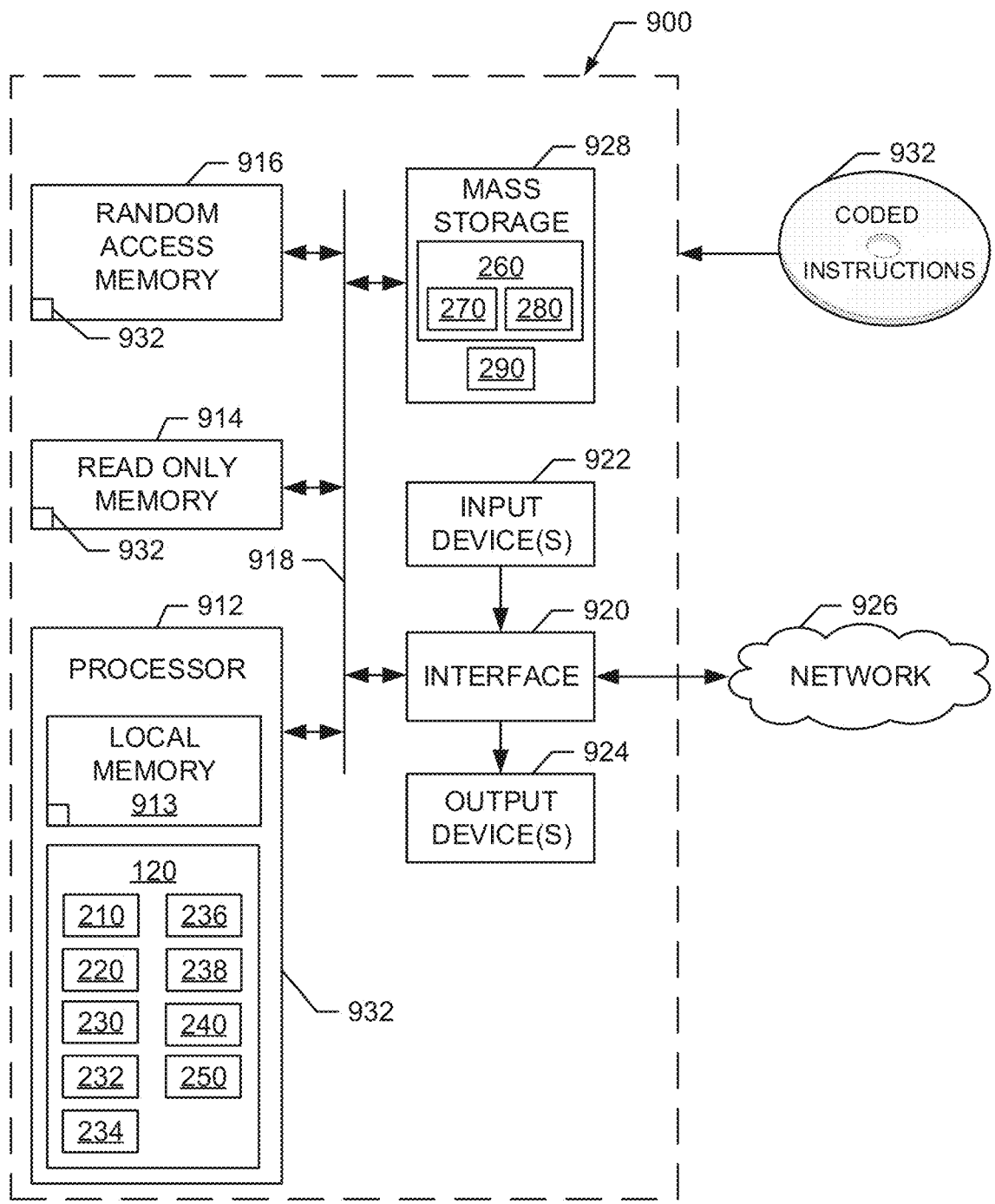
FIG. 9 is a block diagram of an example processor platform capable of executing the instructions of FIGS. 7A and 7B to implement the example media monitor of FIGS. 1 and/or 2.

FIG. 9 is a block diagram of an example processor platform 900 capable of executing the instructions of FIG. 7 to implement the example client device 160, the example media presenter 210, the example event listener 220, the example metadata handler 230, the example structure generator 232, the example file detector 234, the example duration setter 236, the example metadata retriever 238, the example metadata converter 240, the example transmitter 250 and/or the media monitor 165 of FIGS. 1 and/or 2. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The example processor 912 implements the example media presenter 210, the example event listener 220, the example metadata handler 230, the example structure generator 232, the example file detector 234, the example duration setter 236, the example metadata retriever 238, the example metadata converter 240, the example transmitter 250 and/or the media monitor 165 of FIGS. 1 and/or 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device (s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example mass storage 928 and/or the example memories 913, 914, 916 may store the table 260, the metadata tags 270, the playback positions 280, and/or the example multi-file counter 290.

The coded instructions 932 of FIG. 7 may be stored in the mass storage device 928, in the volatile memory 914, in the non-volatile memory 916, and/or on a removable tangible computer readable storage medium such as a CD or DVD.

As mentioned above, to accurately monitor a playback position of media on a client device, conventional media monitoring methods require monitors that are tailored for individual devices and/or families of devices. Examples disclosed herein provide advantages over such conventional monitoring methods by conserving data storage resources that would be required to store specialized monitors for the many different types of devices that are available to consumers. Examples disclosed herein also conserve network communication resources that would be required to provide such specialized monitors to individual devices for monitoring media at those devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to measure exposure to streaming media, the apparatus comprising:
at least one processor;
memory including first instructions that, when executed by the at least one processor, cause the at least one processor to at least:
embed advertisement markers into a media file; and
provide second instructions and the media file to a client device, the second instructions to cause the client device to at least:
upon completion of playback of a first media segment of a multi-segment media, update a multi-file counter with an offset based on a duration of the first media segment;
detect that a second media segment is a segment of the multi-segment media based on the media file;
determine, during presentation of the second media segment, a playback time within the second media segment;
add the playback time to the multi-file counter to determine a corresponding playback time of the multi-segment media;
attempt to perform a lookup of a metadata tag in a table of metadata tags and corresponding playback positions based on the playback time of the multi-segment media; and
in response to successful performance of the lookup, transmit the metadata tag corresponding to the playback time of the multi-segment media to an audience measurement entity.

2. The apparatus of claim 1, wherein the second instructions are to cause the client device to generate the table of metadata tags and corresponding playback positions based on information included in the first media segment of the multi-segment media.

3. The apparatus of claim 2, wherein the table of metadata tags and corresponding playback positions is based on information included in only the first media segment of the multi-segment media.

4. The apparatus of claim 1, wherein the second instructions are to cause the client device to, upon completion of playback of the second media segment, update the multi-file counter with the offset based on the duration of the second media segment.

5. The apparatus of claim 4, wherein the second instructions are to cause the client device to
detect that a third media segment presented intermediate the first media segment and the second media segment is not a segment of the multi-segment media; and
upon completion of playback of the third media segment, not updating of the multi-file counter.

6. The apparatus of claim 5, wherein the third media segment is an advertisement.

7. The apparatus of claim 1, wherein the second instructions are to cause the client device to detect that the second media segment is a segment of the multi-segment media by detecting that a name of the second media segment is an incremented version of the name of the first media segment.

8. The apparatus of claim 1, wherein the second instructions are to cause the client device to detect that the second media segment is a segment of the multi-segment media by detecting that a name of the second media segment complies with a file naming convention for the multi-segment media.

9. The apparatus of claim 1, wherein the second instructions are to cause the client device to, in response to the successful performance of the lookup, add the metadata tag to a list of metadata tags, and transmit the list of metadata tags.

10. A non-transitory computer readable medium comprising first instructions which, when executed, cause a machine to at least:
embed advertisement markers into a media file; and
provide second instructions and the media file to a client device, the second instructions to cause the client device to at least:

upon completion of playback of a first media segment of a multi-segment media, update a multi-file counter with an offset based on a duration of the first media segment;

detect that a second media segment is a segment of the multi-segment media;

determine, during presentation of the second media segment, a playback time within the second media segment;

add the playback time to the multi-file counter to determine a corresponding playback time of the multi-segment media;

attempt to perform a lookup of a metadata tag in a table of metadata tags and corresponding playback positions based on the playback time of the multi-segment media, the table of metadata tags and corresponding playback positions generated based on information included in the first media segment; and in response to successful performance of the lookup, transmit the metadata tag corresponding to the playback time of the multi-segment media to an audience measurement entity.

11. The non-transitory computer readable medium of claim 10, wherein the second instructions when executed, further cause the client device to, upon completion of playback of the second media segment, update the multi-file counter with the offset based on the duration of the second media segment.

12. The non-transitory computer readable medium of claim 11, wherein the second instructions when executed, further cause the client device to:

detect that a third media segment presented intermediate the first media segment and the second media segment is not a segment of the multi-segment media;

upon completion of playback of the third media segment, not update the multi-file counter.

13. The non-transitory computer readable medium of claim 10, wherein the detecting that the second media segment is a segment of the multi-segment media includes detecting that a name of the second media segment complies with a file naming convention for the multi-segment media.

14. The non-transitory computer readable medium of claim 10, wherein the second instructions, when executed, further cause the client device to, in response to the successful performance of the lookup:

add the metadata tag to a list of metadata tags; and transmit the list of metadata tags.

15. A method comprising:

embedding advertisement markers into a media file; and providing instructions and the media file to a client device, the instructions to cause the client device to at least:

upon completion of playback of a first media segment of a multi-segment media, update a multi-file counter with an offset based on a duration of the first media segment;

detect that a second media segment is a segment of the multi-segment media;

determine, during presentation of the second media segment, a playback time within the second media segment;

add the playback time to the multi-file counter to determine a corresponding playback time of the multi-segment media;

attempt to perform a lookup of a metadata tag in a table of metadata tags and corresponding playback positions based on the playback time of the multi-segment media, the table of metadata tags and corresponding playback positions generated based on information included in the first media segment; and in response to successful performance of the lookup, transmit the metadata tag corresponding to the playback time of the multi-segment media to an audience measurement entity.

16. The method of claim 15, wherein the instructions when executed, further cause the client device to, upon completion of playback of the second media segment, update the multi-file counter with the offset based on the duration of the second media segment.

17. The method of claim 16, wherein the instructions when executed, further cause the client device to:

detect that a third media segment presented intermediate the first media segment and the second media segment is not a segment of the multi-segment media;

upon completion of playback of the third media segment, omit updating of the multi-file counter.

18. The method of claim 15, wherein the detecting that the second media segment is a segment of the multi-segment media includes detecting that a name of the second media segment complies with a file naming convention for the multi-segment media.

19. The method of claim 15, wherein the instructions, when executed, further cause the client device to, in response to the successful performance of the lookup:

add the metadata tag to a list of metadata tags; and transmit the list of metadata tags.

\* \* \* \* \*